United States Patent
Peel et al.

[11] Patent Number: 5,907,602
[45] Date of Patent: May 25, 1999

[54] DETECTING POSSIBLE FRAUDULENT COMMUNICATION USAGE

[75] Inventors: Stephen John Peel; David John Woods; Michael Scott, all of Ipswich; John Christopher Regnault, Woodbridge; Christopher John Gibbins; Russel Eaden, both of Ipswich, all of United Kingdom

[73] Assignee: British Telecommunications public limited company, London, United Kingdom

[21] Appl. No.: 08/930,280

[22] PCT Filed: Mar. 29, 1996

[86] PCT No.: PCT/GB96/00763

§ 371 Date: Feb. 9, 1998

§ 102(e) Date: Feb. 9, 1998

[87] PCT Pub. No.: WO96/31043

PCT Pub. Date: Oct. 3, 1996

[30] Foreign Application Priority Data

Mar. 30, 1995 [EP] European Pat. Off. ............. 95302159

[51] Int. Cl.$^6$ ................................................. H04M 15/00
[52] U.S. Cl. ........................... 379/114; 379/134; 379/189; 379/198
[58] Field of Search .................... 379/112, 113, 379/114, 115, 121, 127, 133, 134, 188, 189, 196, 197, 198

[56] References Cited

U.S. PATENT DOCUMENTS 4,893,330  1/1990  Franco ................................. 379/115
5,351,287  9/1994  Bhattacharyya et al. .
5,603,906  2/1997  Phelps ................................. 379/114
5,706,338  1/1998  Relyea et al. ...................... 379/189
5,805,686  9/1998  Moller et al. ...................... 379/198

FOREIGN PATENT DOCUMENTS 583135    2/1994   European Pat. Off. .
653868    5/1995   European Pat. Off. .
661863    7/1995   European Pat. Off. .
618713   10/1995   European Pat. Off. .
9411959   5/1994   WIPO .

*Primary Examiner*—Paul Loomis
*Attorney, Agent, or Firm*—Nixon & Vanderhye P.C.

[57] ABSTRACT

A method of, and a system for, detecting possible fraudulent use of a telecommunications network. Call event records, both call initiation and call completion records, are examined. A call record has a number of key fields, e.g. called number, calling number, calling card number, and for each field in turn the key is used to access a database containing an associated set of profiles. Each profile contains an algorithm defining a measurement process to be performed on the call data, e.g. determine the call duration. The respective process results are added to a respective set of stores associated with each profile, and an alarm response is generated when a threshold of a store is reached. An additional process for e.g. a call duration of e.g. called number card calling number key fields, convert the process results to penalty points which are added to a penalty points store associated with the calling card number key of the call event record under examination. Each response is recorded in a history file for that key.

21 Claims, 7 Drawing Sheets

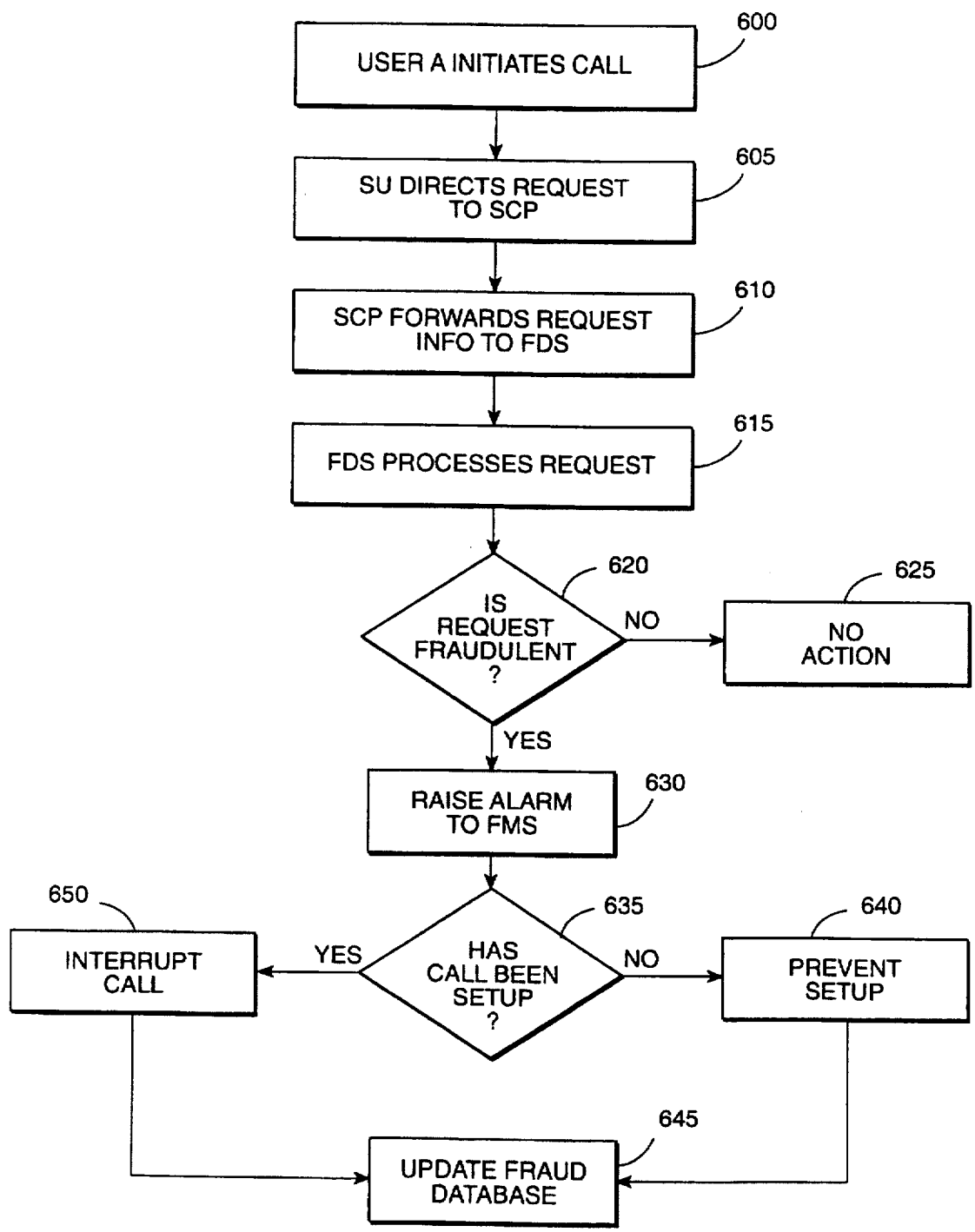

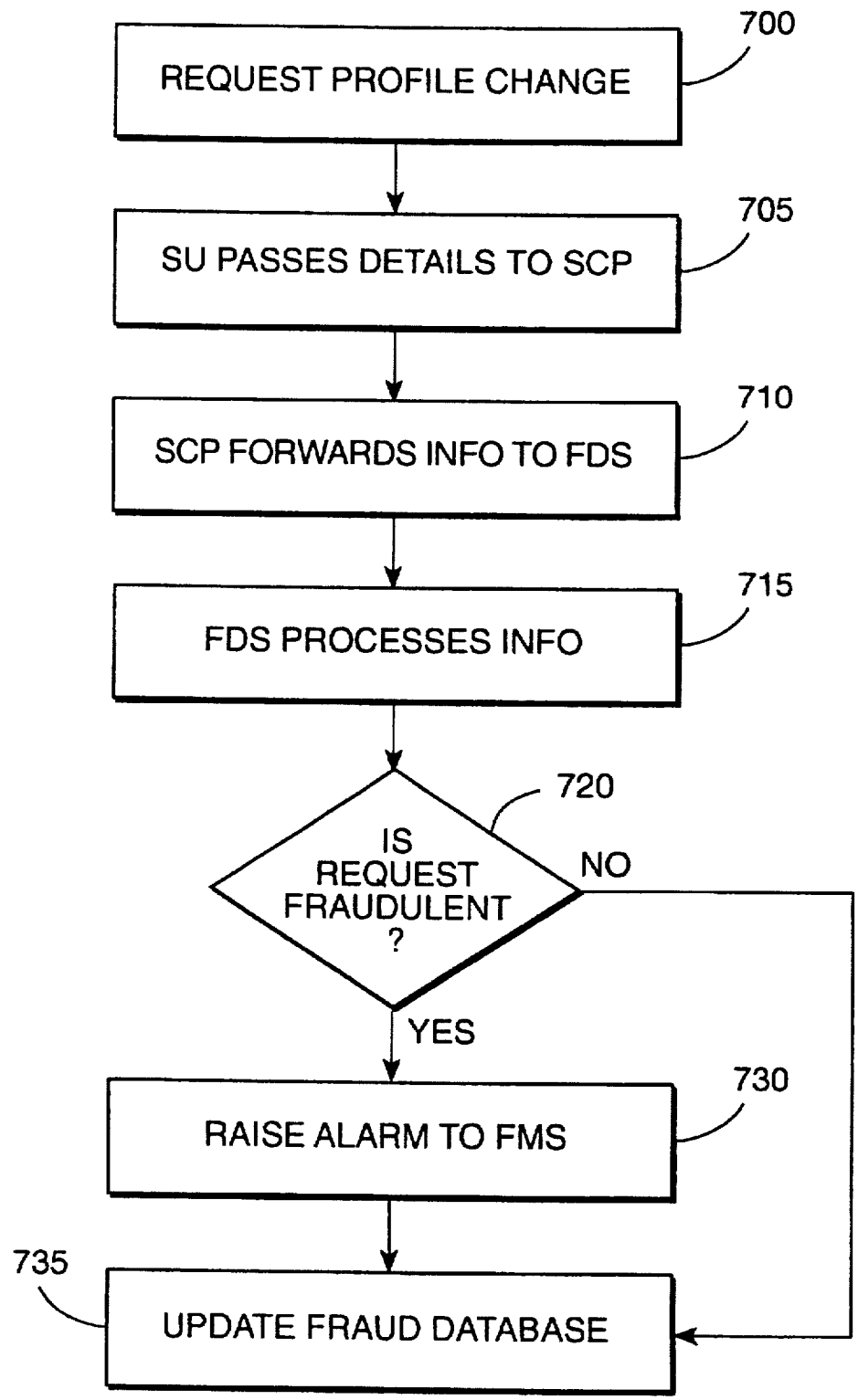

5,907,602

DETECTING POSSIBLE FRAUDULENT COMMUNICATION USAGE

This invention relates to methods of, and systems for, detecting possible fraudulent use of a communications network.

Early detection of possible fraudulent use of communications services provided on a network is desirable in order to limit the financial liability of the network operator, the service provider and the customer, for convenience any or all of these will be referred to hereinafter as a protected person (PP).

A fraud detection system is known from WO-A-94 11959 (Coral Systems, Inc.) in which a parameter of a particular subscriber's current usage is compared with a subscriber-specific pattern of the particular subscriber's historic usage. For example, the subscriber-specific pattern can be a five day rolling average of the daily number of calls made by the subscriber, or it can be the maximum number of calls ever made by the subscriber in a day.

A fraud detection system is known from EP A 0 618 713 (AT&T Corporation) for providing fraud monitoring for a network customer for whom a telephone service provider (network operator) provides private network facilities via a Software Defined Network, access to which is obtained through the use of an authorisation code or toll-free telephone number ("800" number). In this system, a fraud monitoring processor uses the call attributes that are stored in a call detail record to derive various indices (e.g. average call duration for calls made using a selected authorisation code). The fraud monitoring processor then compares the call attributes and/or derived indices with preselected thresholds which the network customer (perhaps with the assistance of the telephone service provider) has previously selected or established as being indicative of abnormal network usage. The thresholds are established by the network customer in view of its particular needs or preferences.

According to a first aspect of the present invention, there is provided a method of detecting possible fraudulent use of a communications network, which network is arranged to provide call event records having fields containing call event data, at least one of the fields being designated a key field and containing a key relating to an entity as herein defined, the method comprising the steps of:

reading a first key field of a call event record and obtaining its key;
addressing a database by the combination of the first key field and the obtained key (referred to as the "first combination") to access a first combination-associated profile set comprising
(i) at least one profile identifying
   (a) a respective call event data processing algorithm defining a process to be performed upon call event data to obtain a process result,
   (b) at least one first combination-associated first store to be incremented by the process result, and at least one respective threshold for the or each said first combination-associated first store,
   (c) a respective predetermined outcome to be generated when the contents of a said first combination-associated first store reaches a threshold, at least one said predetermined outcome comprising a fraud risk indicator,
(ii) a further profile identifying
   (d) a first combination-associated second store to be incremented by a fraud risk indicator,
   (e) at least one respective threshold for said first combination-associated second store, and
   (f) a further respective predetermined outcome to be generated when the contents of said first combination-associated second store reaches a threshold;
processing the call event data of the call event record in accordance with said first combination-associated profile set, thereby
obtaining one or more respective process results,
incrementing the corresponding identified first combination-associated first store or stores by the respective process result, and, if a threshold is reached,
generating the corresponding respective predetermined outcome, and, if a fraud risk indicator is generated,
incrementing said first combination-associated second store by that fraud risk indicator, and, if a threshold is reached,
generating the corresponding further respective predetermined outcome.

In this first aspect, preferably a second of the fields of the call event record is designated a key field and contains a key relating to an entity as herein defined, and the method comprises the further steps of:

reading the second key field of the call event record and obtaining its key;
addressing the database by the combination of the second key field and the obtained key (referred to as the "second combination") to access a respective second combination-associated profile set comprising,
(i) at least one profile identifying
   (g) a respective call event data processing algorithm defining a process to be performed upon call event data of a call event record to obtain a process result,
   (h) at least one second combination-associated first store to be incremented by the process result, and at least one respective threshold for the or each said second combination-associated first store,
   (j) a respective predetermined outcome to be generated when the contents of a said second combination associated first store reaches a threshold, at least one said predetermined outcome comprising a fraud risk indicator,
(ii) a yet further profile identifying
   (k) the respective first combination-associated second store for the call event record being currently processed to be incremented by a fraud risk indicator generated by a profile of its own profile set;
processing the call event data of the call event record in accordance with said respective second combination-associated profile set, thereby
obtaining one or more respective process results,
incrementing the corresponding identified second combination-associated first store or stores by the respective process result, and, if a threshold is reached,
generating the corresponding respective predetermined outcome, and, if a fraud risk indicator is generated,
incrementing said first combination-associated second store by that fraud risk indicator, and, if a threshold of said first combination-associated second store is reached,
generating a further respective predetermined outcome in accordance with the further profile of said first combination-associated profile set.

According to a second aspect of the present invention there is provided a method of detecting possible fraudulent use of a communications network, which network is arranged to provide call event records having fields containing call event data, at least one of the fields being designated a key field and containing a key relating to an entity as herein defined, the method comprising the steps of:

reading a first key field of a call event record and obtaining its key;

addressing a database by the combination of the first key field and the obtained key (referred to as the "first combination") to access a first combination-associated profile set comprising (i) at least one profile identifying (a) a respective call event data processing algorithm defining a process to be performed upon call event data to obtain a process result, (b) a respective function to be applied to the process result to generate a fraud risk indicator, (c) at least one first combination-associated first store to be incremented by the process result, and at least one respective threshold for the or each said first combination-associated first store, (d) a respective predetermined outcome to be generated when the contents of a said first combination-associated first store reaches a threshold, (ii) a further profile identifying (e) a first combination-associated second store to be incremented by a fraud risk indicator, (f) at least one respective threshold for said first combination-associated second store, and (g) a further respective predetermined outcome to be generated when the contents of said first combination-associated second store reaches a threshold;

processing the call event data of the call event record in accordance with said first combination-associated profile set, thereby obtaining at least one respective process result and associated fraud risk indicator, incrementing the corresponding identified first combination-associated first store or stores by the respective process result, and, if a threshold is reached, generating the corresponding respective predetermined outcome, incrementing said first combination-associated second store by the associated fraud risk indicator, and, if a threshold is reached, generating the corresponding further respective predetermined outcome.

In this second aspect, preferably a second of the fields of the call event record is designated a key field and contains a key relating to an entity as herein defined, and the method comprises the further steps of:

reading the second key field of the call event record and obtaining its key;

addressing the database by the combination of the second key field and the obtained key (referred to as the "second combination") to access a respective second combination-associated profile set comprising, (i) at least one profile identifying (h) a respective call event data processing algorithm defining a process to be performed upon call event data of a call event record to obtain a process result, (j) a respective function to be applied to the process result to generate a fraud risk indicator, (k) at least one second combination-associated first store to be incremented by the process result, and at least one respective threshold for the or each said second combination-associated first store, (l) a respective predetermined outcome to be generated when the contents of a said second combination-associated first store reaches a threshold, (ii) a yet further profile identifying (m) the respective first combination-associated second store for the call event record being currently processed to be incremented by a fraud risk indicator generated by a profile of its own profile set;

processing the call event data of the call event record in accordance with said respective second combination-associated profile set, thereby obtaining at least one respective process result and associated fraud risk indicator, incrementing the corresponding identified second combination-associated first store or stores by the respective process result, and, if a threshold is reached, generating the corresponding respective predetermined outcome, incrementing said first combination-associated second store by the associated fraud risk indicator, and, if a threshold of said first combination-associated second store is reached, generating a further respective predetermined outcome in accordance with the further profile of said first combination-associated profile set.

According to a third aspect of the present invention there is provided a fraud detection system for detecting possible fraudulent use of a communications network, which network is arranged to provide call event records having fields containing call event data, at least a first of the fields being designated a key field and containing a key relating to an entity as herein defined, the system comprising:

means for reading a key field of a call event record and obtaining its key and for addressing a database by the combination of said key field and the obtained key (referred to as a "combination");

a database addressable by a said combination and storing a plurality of respective profile sets associated with a first key field and a plurality of keys (referred to as "first combination-associated profile sets"), each first combination-associated profile set comprising (i) at least one profile identifying (a) a respective call event data processing algorithm defining a process to be performed upon call event data of a call event record to obtain a process result, (b) at least one first combination-associated first store to be incremented by the process result, and at least one respective threshold for the or each store, (c) a respective predetermined outcome to be generated when the contents of a said first combination-associated first store reaches a threshold, at least one said predetermined outcome comprising a fraud risk indicator, (ii) a further profile identifying (d) a first combination-associated second store to be incremented by a fraud risk indicator, (e) at least one respective threshold for said first combination-associated second store (f) a further respective predetermined outcome to be generated when the contents of said first combination-associated second store reaches a threshold;

means for processing the call event data of the call event record in accordance with said first combination-associated profile set, thereby obtaining one or more respective process results, incrementing the corresponding identified first combination-associated first store or stores by the respective process result, and, if a threshold is reached, generating a said respective predetermined outcome, and, if a fraud risk indicator is generated, incrementing said first combination-associated second store by the fraud risk indicator, and, if a threshold is reached, generating the corresponding further respective predetermined outcome.

In a system of this third aspect, for use when a second of said fields is designated a key field and contains a key relating to an entity as herein defined, preferably the database stores a plurality of respective second combination-associated profile sets comprising (i) at least one profile identifying (g) a respective call event data processing algorithm defining a process to be performed upon call event data of a call event record to obtain a process result, (h) at least one second combination-associated first store to be incremented by the process result, and at least one respective threshold for the or each store, (j) a respective predetermined outcome to be generated when the contents of a said second combination-associated first store reaches a threshold, at least one said predetermined outcome comprising a fraud risk indicator, (ii) a yet further profile identifying (k) the respective first combination-associated second store for the call event record being currently processed to be incremented by a fraud risk indicator generated by a profile of its own profile set, and said processing means is arranged to process the call event data of the call event record in accordance with said respective second combination-associated profile set, thereby obtaining one or more respective process results, incrementing the corresponding identified second combination-associated first store or stores by the respective process result, and, if a threshold is reached, generating a said respective predetermined outcome, and, if a fraud risk indicator is generated, incrementing said first combination-associated second store by that fraud risk indicator, and, if a threshold is reached, generating the corresponding further respective predetermined outcome.

According to a fourth aspect of the present invention there is provided a fraud detection system for detecting possible fraudulent use of a communications network, which network is arranged to provide call event records having fields containing call event data, at least a first of the fields being designated a key field and containing a key relating to an entity as herein defined, the system comprising:

means for reading a key field of a call event record and obtaining its key and for addressing a database by the combination of said key field and the obtained key (referred to as a "combination");

a database addressable by a said combination and storing a plurality of respective profile sets associated with a first key field and a plurality of keys (referred to as "first combination-associated profile sets"), each first combination-associated profile set comprising (i) at least one profile identifying (a) a respective call event data processing algorithm defining a process to be performed upon call event data of a call event record to obtain a process result, (b) a respective function to be applied to the process result to generate a fraud risk indicator, (c) at least one first combination-associated first store to be incremented by the process result, and at least one respective threshold for the or each store, (d) a respective predetermined outcome to be generated when the contents of a said first combination-associated first store reaches a threshold, (ii) a further profile identifying (e) a first combination-associated second store to be incremented by a fraud risk indicator, (f) at least one respective threshold for said first combination-associated second store (g) a further respective predetermined outcome to be generated when the contents of said first combination-associated second store reaches a threshold;

means for processing the call event data of the call event record in accordance with said first combination-associated profile set, thereby obtaining at least one respective process result and associated fraud risk indicator, incrementing the corresponding identified first combination-associated first store or stores by the respective process result, and, if a threshold is reached, generating the corresponding respective predetermined outcome, incrementing said first combination-associated second store by the fraud risk indicator, and, if a threshold is reached, generating the corresponding further respective predetermined outcome.

In a system of this third aspect, for use when a second of said fields is designated a key field and contains a key relating to an entity as herein defined, preferably the database stores a plurality of respective second combination-associated profile sets comprising (i) at least one profile identifying (h) a respective call event data processing algorithm defining a process to be performed upon call event data of a call event record to obtain a process result, (j) a respective function to be applied to the process result to generate a fraud risk indicator, (k) at least one second combination-associated first store to be incremented by the process result, and at least one respective threshold for the or each store, (l) a respective predetermined outcome to be generated when the contents of a said second combination-associated first store reaches a threshold, (ii) a yet further profile identifying (m) the respective first combination-associated second store for the call event record being currently processed to be incremented by a fraud risk indicator generated by a profile of its own profile set, and said processing means is arranged to process the call event data of the call event record in accordance with said respective second combination-associated profile set, thereby obtaining at least one respective process result and associated fraud risk indicator, incrementing the corresponding identified second combination-associated first store or stores by the respective process result, and, if a threshold is reached, generating the corresponding respective predetermined outcome, and, if a fraud risk indicator is generated, incrementing said first combination-associated second store by that fraud risk indicator, and, if a threshold is reached, generating the corresponding further respective predetermined outcome.

An advantage of the present invention is that a protected person has an additional level of protection as compared with the prior art methods mentioned earlier. If, for example, a protected person wishes to have this extra level of protection in relation to his calling card, then the aforementioned first key field is the calling card field, and the second key field is most usefully the called number field. In this way, when a call is made to a "hot" number, e.g. a bulletin board, the risk indicator store is incremented with the predetermined value, for example "fifty" for a call of ten minutes. A "hot" number is one that is known as being used for fraudulent purposes and which has been entered by the network operator as a key in the called number key type section of the database.

A call of similar duration to, say, a premium service number may result in the generation of a lower risk indicator, depending upon the particular predetermined threshold response, or upon the conversion function applied to the process result.

In another example, if a corporate client of a network operator wishes to have this extra protection in relation to possible fraudulent use of its PABX, then the aforementioned first key field is the calling number field. In these and other uses of the present invention, the accumulation of the risk indicators provides a more sensitive detection than merely counting calls to "hot" destinations.

In a preferred embodiment of the present invention, a default profile set can be allocated by, for example, a network operator or a service provider, to a new user whose credit worthiness is not known, in order to protect itself against fraudulent use of the network by the new user, and then change the profile set in accordance with future circumstances. An example of this latter would be to respond to the sequence numbers of the user's telephone bills to replace a high-risk profile (i.e. one with a low threshold) by a lower-risk profile (i.e. one with a higher threshold) to reduce the likelihood of alarms being generated by non-fraudulent use by that user.

The term call event record as used herein is not limited to records resulting from requests for connection to network destination terminals (calls), but includes equivalent data relating to network facilities (also known as services), for example a request to activate call diversion service to have incoming calls to a user's telephone diverted (re-routed) to a destination number supplied by the user in the request, or a request for a conference call (also known as three-way calling). In this context the term user request encompasses telephone calls and the like, requests for network facilities, and any other type of network request.

The term entity as used herein in relation to profile sets means a set of characters representing the identity of a user of the network, either directly, or indirectly, e.g. through the identity of associated item of terminal equipment (e.g. telephone), and includes an originating network terminal (e.g. telephone) number, a destination terminal number, an account number, a mobile telephone number, a universal personal telecommunications number (personal number), a calling card number (also known as a charge card number), or a user identity. Also, in the context of the present invention the term user is not limited to an actual person, but includes a legal person, and items of network equipment.

Where a key field is the called number field, a PP will decide those numbers (keys) which will trigger processing of the call event record. These could be the numbers for premium rate services, e.g. numbers beginning with 0891, 0898 and the like, international chat lines, bulletin boards, etc. The PP can select the level and comprehensiveness of the protection.

As described in more detail later, profiles can be arranged to count numbers of calls (attempted calls and/or completed calls), or to measure call usage (duration). Thus a process result of the invention includes a unit to be added to the corresponding store, e.g. in the case of counting calls made, and includes the numerical value of the call duration in, say, minutes.

Where a threshold has been reached, the generated outcome may include arranging for the entry in a log of the next n call event records occurring which have the same value of key in the first field as that of said call event record.

Specific embodiments of the various aspects of the present invention will now be described by way of example with reference to the drawings in which:

FIG. 6 is a flow chart of an example of a call request fraud detection and management procedure;

FIG. 7 is a flow chart of an example of a profile change request fraud detection and management procedure;

Figure 1:
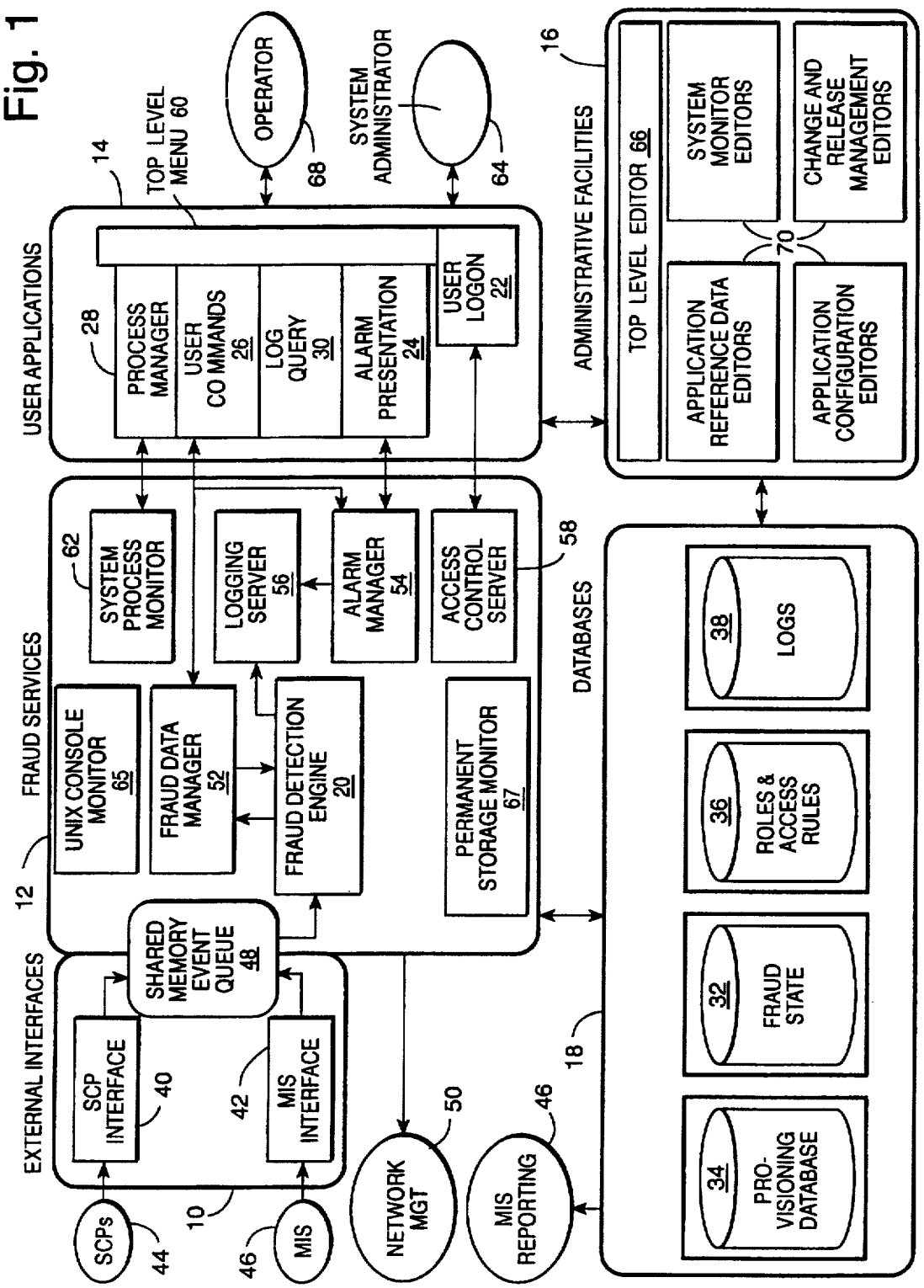
FIG. 1 shows the application architecture of a Fraud Detection and Control System (FDCS) embodying a fraud detection system of the present invention.

In FIG. 1, a Fraud Detection and Control System (FDCS) is shown operationally coupled to various items of a communications network (not shown, per se). The application architecture of the FDCS is in the form of separate functional blocks comprising an External Interfaces block 10, a Fraud Services block 12, a User Applications block 14, an Administrative Facilities block 16 and a Databases block 18. Each of the blocks 10 to 16 comprises one or more object oriented application processes and only the principal inter-process communication links are shown. The Fraud Services of the block 12 are also referred to as Fraud Application Services.

The External Interfaces of block 10 are responsible for communicating directly with systems outside the FDCS. They receive raw events and format them for analysis as well as wrapping any necessary communication protocols around outbound transactions to other systems.

The Fraud Services of block 12 support the system as a whole. They provide call event analysis, alarm generation, alarm routing, security control, logging control, and application infrastructure on behalf of all users. Although the FDCS may be "scaled up" by running multiple copies of a Fraud Detection Engine (FDE) 20 of block 12, typically only one copy of the FDE 20 will exist per implementation.

The User Applications of block 14 provide a layer of visibility into the Fraud Application Services of block 12. User Applications include User Logon 22, Alarm Presentation 24, User Commands 26, Process Manager 28, and Log Query 30. User Applications are distinguished by the fact that each user of the system has their own copy. Though the User Applications may share a processor with the Fraud Application Services, they will typically run on intelligent workstations.

The Administrative Facilities of block 16 are a special type of User Application. They provide a set of tools to configure and provision the FDCS. Administrative Facilities are not meant to be universally available and are typically restricted to users associated with system administrator roles.

In addition to the four types of application components, namely the blocks 10, 12, 14 and 16, the FDCS uses a number of logical databases which comprise the Databases block 18. The principal databases are:

A Fraud State database 32 which is used by the FDE 20 to provide a view of its state. It contains the current relationships between keys, profile sets, and profiles as well as current bucket values.

A Provisioning database 34 which holds the relatively static reference data needed by the Fraud Application Services and User Application. This includes profile set, and profile definitions, log definitions, and alarm presentation defaults.

A Roles and Access Rules database 36 which is a secured database controlling privileges and access rights granted to users of the FDCS.

A Logs database 38 which contains the logs of alarms, call events, and user activity.

The FDCS contains five external interfaces. Three processes resident in block 10 support the inflow of call events from the network: one process (40, 42) for each of two types of input data streams from the network (from Service Control Points (SCPs) 44 and from a Management Information System (MIS) 46) and one process (Shared Memory Event Queue 48) to collect the events and present a stable interface to the FDE 20. A module included in each server permits the process to communicate through a Network Management Interface (not shown) to a Network Management System 50 of the network. Finally, a MIS reporting interface (not shown) resident in the Databases block 18 permits access to the FDCS database from remote platforms, in particular, the MIS 46.

The SCP Interface 40 includes an X.25 gateway which supports an application programming interface which is used to deliver call event data to customised event identification and data extraction modules of the SCP Interface 40.

The MIS Interface 42 consists of a customised application which processes files of priced call event records. These files are received from the MIS 46 using a standard UNIX (a Registered Trade Mark of UNIX Systems Laboratories, Inc.) File Transfer Protocol.

The Network Management Interface is not a process, but a module included in all other processes running on the FDCS server platform. Whenever a process must send an alarm through the interface, it invokes its associated module. The module will format the alarm and send it to the UNIX print daemon, which then passes it on to the Network Management 50.

The MIS Reporting Interface is implemented using the distributed architecture of the proprietary database products. When a report is required, the MIS 46 will connect to the FDCS, and close the connection upon completion. The MIS 46 will have access to the database through data views as opposed to physical tables.

Fraud Services fall into two categories: those which directly support the business of detecting and controlling network fraud and those which control and report on the state of the entire application. The FDE 20, a Fraud Data Manager 52, and an Alarm Manager 54 fall into the first category, while remaining processes are in the second.

The FDE 20 analyses normalised call events and takes action when it detects suspicious patterns of usage. Based on the current system configuration, the data in each event is used to derive a series of measurements as defined by respective profile algorithms. Each measurement is accumulated over a number of time intervals into buckets (constituting stores of the present invention). When the value of a bucket crosses any of the thresholds defined for it, the FDE 20 responds. The response taken may be the generation of an alarm message or the logging of detailed event information.

Measurements made by the FDE 20 can depend on the data received in a call event, so that its behaviour can be customised in unique ways. For example, calls to certain destination, such as Columbia, might be considered suspicious under normal circumstances. However, if a particular corporate customer has a branch office in Columbia, calls to that region would not be considered suspicious for that customer.

The Fraud Data Manager 52 is responsible for managing the cache of keys and buckets on behalf of the FDE 20. Its principal task is to optimise the chances that a key and its associated buckets are in memory when they are requested by the FDE 20. It makes sure that when multiple FDEs are running that bucket updates are serialised.

The Alarm Manager 54 receives alarms generated by the FDE 20. It maintains the master copy of all current alarms, distributes those alarms to the appropriate users, and tracks changes to the state of each alarm. Each alarm has a number of attributes, including the alarm text, time stamp, severity, and status.

The state of an alarm can be either unassigned, assigned, or cleared. In addition, users have the ability to reassign an alarm assigned to themselves to another user, or to modify the severity of the alarm. Each time the state of an alarm changes, the Alarm Manager 54 requests that an entry be made in an alarm log controlled by a Logging Server 56.

The Alarm Manager 54 applies an escalation policy to alarms that are not acknowledged within a configurable time-out period. As time-out occurs, the severity level of the alarm is raised. As a last resort, a warning message will be sent to the Network Management 50, to the effect that there has been no acknowledgement of suspected fraudulent usage.

The Logging Server 56 provides a single point for control of all logging in the FDCS. Any process in the FDCS that needs to log information, connects to the Logging Server and passes it the records it wishes logged.

An Access Control Server 58 governs user access to the FDCS. When another process must validate a request for data or services, it will query the Access Control Server 58. When a user 68 (also referred to herein as an operator or a fraud operator or an investigator) logs on to the FDCS, the Access Control Server 58 validates the user and determines their role. It then supplies information to a Top Level Menu 60 of block 14 enabling only those facilities to which that user's role has access, and ensures that a particular User ID is associated with only one connection to the FDCS at a time.

A System Process Monitor 62 monitors the health of the FDCS. This process allows a System Administrator 64 to start and stop other FDCS processes. It receives signals from the FDCS processes on their health. If a process has changed its state, the System Process Monitor 62 sends a signal notifying the Process Manager 28 of the change as well as sending an alarm to the Network Management 50.

A UNIX Console Monitor 65 periodically performs monitoring functions and forwards new messages to the Network Management 50.

A Permanent Storage Monitor 67 periodically examines the size of UNIX files and file systems along with tables and tablespaces. If the size of any item exceeds a predetermined threshold, the process sends a message to the Network Management 50.

User Applications

The User Logon application 22 is the only means by which a user 68 may gain access to the services provided by the rest of the FDCS. The application collects a User ID and password from the user 68 and passes it to the Access Control Server 58 for validation. User Logon 22 employs the validation response to enable only those windows, menu entries, and buttons specifically permitted to that user.

The User Commands application 26 represent a collection of miscellaneous menu items which are actually part of the Top Level Menu 60. These include commands to mark and unmark keys for logging, to control whether or not fraud alarms are sent to the Network Management 50, and to initiate background reporting tasks.

The Alarm Presentation application 24 contains several major displays used by users 68 (operators and investigators) to work with the generated alarms. The users can perform a number of operations upon the current alarms using the Alarm Presentation 24. They can accept an alarm, indicating that they are assuming responsibility for it and they can clear an alarm that they have previously accepted. Other operations include the reassignment of an accepted alarm to another user, and, for suitably privileged users, the ability to escalate or de-escalate the severity of an alarm. Alarms can be displayed in both summary and detail formats.

The Log Query application 30 provides both SQL and non-SQL interfaces to the data logged by the various FDCS processes. For SQL-based queries, a simple command line interface is provided. For non-SQL queries, a series of forms will be available to support query-by-example.

The Process Manager application 28 presents a topology map representing the entire FDCS to the System Administrator 64. The icons in the map represent individual processes. The icons change both their shape and colour depending on their status (e.g. initialising, running, terminating). Properly authorised users may access the Process Manager 28 to start or terminate any individual application process.

Administrative Facilities and Configuration Change

The Administrative Facilities are a collection of system editors which are used to control system configuration. The editors provide an easy way to manipulate the configuration data used by the servers that control the operation of the FDCS. There are editors for Alarm Management and Presentation, profile sets and profiles, Configuration Management, Access Control, Logging Control, Customer Provisioning, for the FDCS application runtime parameters. All editors are accessed through a window of a common Top Level Editor 66. Editors within this facility are available only to suitably privileged users, such as System Administrators 64.

The Administrative Facilities also provide the application's release management functions. With the important exception of objects comprising the profile and profile set, most configuration modifications are released directly into the running application programs. Profile and profile set structures, however, determine how call events are analysed and what patterns may indicate fraudulent network usage. These structures are therefore subjected to change management procedures, are staged, and released in a way which permits a rollback to occur if the release of any component fails. When the production database has been successfully updated, the FDE(s) 20 must be quiesced and halted. One or more new FDEs 20 can then be started with the new profiles and profile sets placed in their memory-resident object models.

Most changes to a profile set structure will invalidate the statistics which have been collected under its control. Only changes to threshold values and responses can be implemented without affecting how current bucket totals are interpreted. All other changes to a profile set structure will cause its associated buckets to be re-initialised for the first time they are referenced following the change.

The FDCS includes a number of Shared Services which are modules which supply application services needed by more than one process in the FDCS. Each set of services is implemented using a set of callable routines and data structures which together form an Application Programming Interface (API) for the service.

Event Queuing Services performed by the Shared Management Queue 48 provide a high-performance queuing mechanism which is used to deliver call event records from the External Interfaces 40 and 42 to the FDE 20. The External Interfaces 40 and 42 transform event records from an external format to a standard, internal format used throughout the FDCS, and the Event Query 48 buffers the standard event records awaiting processing by the FDE 20.

Queues are implemented as circular buffers of fixed size, in shared memory. The use of shared memory eliminates much of the overhead involved in other types of interprocess communications. Event data in the queue appears as if it were local to each process, and can be read and written using the API routines provided.

A single queue can have multiple readers and multiple writers. The API routines provide built-in synchronisation to ensure transaction integrity.

Figure 2:
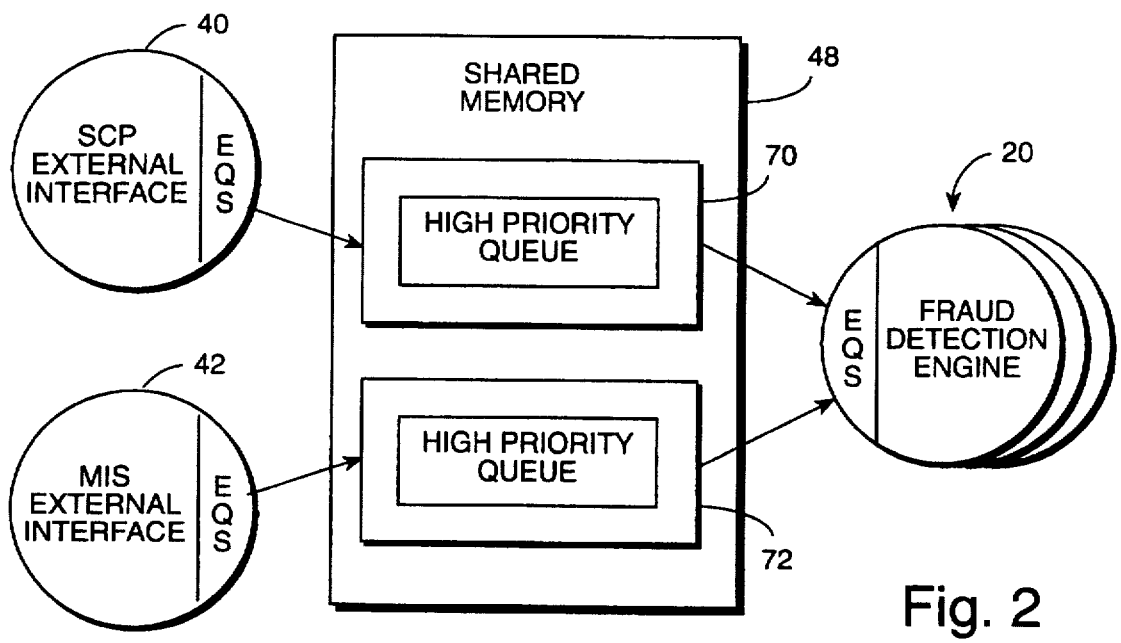
FIG. 2 is a diagram showing the arrangement of an Event Queuing Services component of the FDCS.

As shown in FIG. 2, the Event Queuing Services implements two levels of priority. A higher priority queue 70 is used for SCP events, while a lower priority queue 72 is used for MIS events. A process which reads from the queue services receives the highest priority event currently available.

The shared memory area used by the Event Queuing Services is of fixed size, which is based on the capacity and throughput requirements of the FDCS. This fixed size places a constraint on the number of events which can be buffered within the system.

Records are received from the MIS 46 using a file transfer mechanism. As space becomes available in the low priority queue, the MIS Interface 42 process will refill the queue with records read from the MIS file.

Records are received from the SCPs 44 using a teleprocessing link. The high priority queue is used to buffer SCP event records until they can be processed by an FDE 20. If the capacity requirements of the FDCS are exceeded, the high priority queue overflows, and call event records from the SCPs 44 will be dropped.

Figure 3:
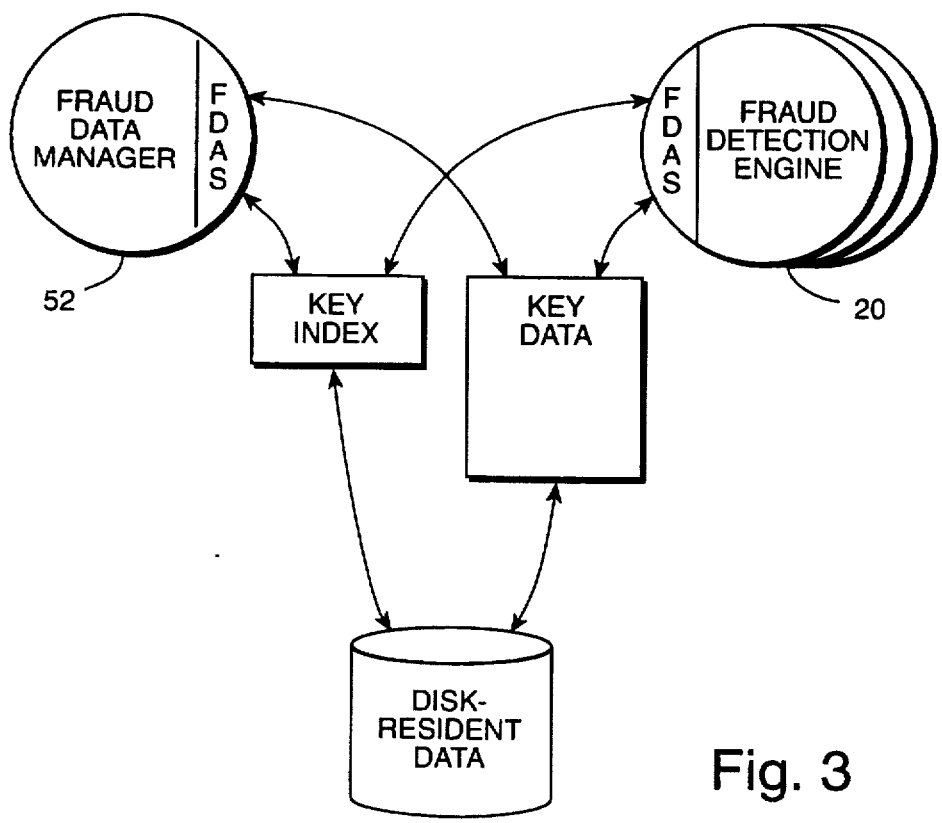
FIG. 3 is a diagram of a Fraud Database Access Services component of the FDCS.

As shown in FIG. 3, Fraud Database Access Services (FDAS) is a common module, shared by the Fraud Data Manager 52 and the FDE 20, that provides shared access to high volumes of fraud data. Data for the most active keys is kept memory-resident for high performance. FDAS encapsulates all operations that application programs must perform against the shared fraud database. From the standpoint of the application programs, FDAS presents the memory-resident data and the disk-resident data as one logical database.

The Network Management Interface (NMI) is a FDCS module which passes messages to the Network Management 50. The NMI messages are sent to give an indication of the health of the FDCS to the Network Management 50.

There are nine types of messages sent via the NMI. Five of these are messages relating to the FDCS fraud alarms. These five are Initial Fraud Alarms, Unacceptable Alarms, Undelivered Alarms, Operator Assignment, and Alarm Clears. The other four types of messages are System Process Monitor (SPM) Faults, SPM Fault Clears, Process Faults, and Platform Faults. The sending of the five types of messages relating to the FDCS fraud alarms can be turned off and on via a user command available from the Top Level Menu process 60.

Processes use the NMI module to format and send messages to the Network Management 50. The NMI is not a separate process, but rather a part of the processes which use it. It is used by every server process in the FDCS.

The SCP Interface 40 monitors the appearance of SCP files on the server. When a new SCP file has finished its transmission, the SCP Interface 40 starts reading the records in the file for subsequent analysis by the FDCS. The SCP Interface 40 reads in records from multiple SCP files and checks to see which record from each file is the oldest. This is done to keep records in chronological order, so they can be correctly analysed by the FDE 20. The SCP Interface 40 then identifies the event type and extracts the needed fields from the record. Once these have been extracted the SCP Interface 40 normalises the call event and places it in a queue in the Shared Memory Event Queue 48 so the FDE 20 has access to it.

The External Interface/Management Information System
The MIS Interface 42 provides a way to receive call event records from the MIS 46. The records from the MIS 46 differ slightly from the records created by the SCP 44. The MIS 46 records contain call duration and pricing information that is used by the FDE 20 to monitor usage patterns that might represent fraud. The process hides file management and file manipulation functionality from the rest of the FDCS.

The MIS Interface 42 monitors the appearance of MIS files on the server. When a new MIS file has finished its transmission, the MIS Interface 42 starts reading the records in the file for subsequent analysis by the FDCS.

The MIS Interface 42 parses the records in the file, determines the record's event type and extracts specific fields. These fields are then formatted into a normalised call record. This record is then put in a queue in the Shared Memory Event Queue 48 so the FDE 20 has access to it.

The FDE 20 analyses incoming call event records to detect possible fraudulent use of the network. There may be more than one FDE 20 running simultaneously in the FDCS. In this case, all FDEs 20 share a common database containing the current fraud state. This architecture allows the FDCS to achieve higher throughput rates when deployed on a multi-processor platform.

The FDE 20 performs a series of measurements on each call event. Measurements are generally accumulated over time. Accumulated measurement values are compared with thresholds to determine whether the thresholds have been reached. When thresholds have been reached, the FDE 20 responds by performing a set of actions, which may include creating fraud alarms, or logging event trace records.

Certain responses are based on the value of a single measurement, which is not accumulated over time. An immediate response is a response generated whenever a single measurement made on an event is greater than or equal to a threshold. For example, an immediate response may be used to create an alarm each time a partial record is received, or each call is made to a suspicious country. For this type of response the time interval is zero. In this way the same mechanism is used as for non-zero time intervals.

The System Process Monitor 62 is responsible for starting each FDE 20, monitoring its status, and shutting it down. At start-up, the FDE 20 performs a series of initialisation steps, and begins processing events. When the FDE 20 receives a shutdown message, it performs a series of finalisation steps, and exits with a successful status.

FDEs 20 act as clients to the Alarm Manager process 54. An FDE 20 will raise alarms when it detects a suspicious pattern of usage in the call event stream. These alarms are created using a remote procedure call to the Alarm Manager process 54. This procedure call is issued asynchronously so that an FDE 20 can continue working while the Alarm Manager 54 processes the alarm.

FDEs 20 act as clients to the Logging Server process 56. An FDE 20 will log a subset of the call event data it processes. Events are logged by issuing a remote procedure call to the Logging Server process 56. This procedure call is issued asynchronously, so that an FDE 20 can continue processing while the event data is being logged.

Each FDE 20 is dependent on a fraud database containing keys, buckets, and historical data. In order to meet the FDCS performance requirements, the most active portions of this database will be cached in physical memory, while the least active portions will remain disk-resident.

The role of the Fraud Data Manager (FDM) 52 is to create and maintain the database caches used by the FDEs 20. At application start-up, the FDM 20 will initialise these caches, based on its private object model. The FDEs 20 will not be allowed to access this database until initialisation is complete.

The FDE 20 performs processing on each event it receives in accordance with the following program:

```
Determine event type
Determine key fields from event type definition
For each key in the event
        Look up key, buckets, and history in the database
        If key does not exist
                If key is not dynamic
                        Go on to the next key field in the event
                else
Determine profile set for new key using the default profile set policy
                        If profile set can be determined
Create new key, buckets, and history according to default profile set
                                else
Go on to the next key field in the event
                                end if
                        end if
                end if
                For each profile in the key's profile set
                        Obtain the measurement value
                        For each bucket affected by the measurement
                                If the bucket time interval has expired
                                        reset the bucket
                                end if
Update the bucket using the measurement value
If the new bucket values causes a threshold to be reached
Create responses (the outcome) defined for this bucket (i.e. send an alarm to the
Alarm Manager and/or, mark the current event for logging and/or, mark the next n
events for this key for logging)
                                end if
                        end for each
                end for each
                Store key, buckets, and history in the database
        end for each
        If the current event is marked for logging
                log the current event
        end if
```

If a key for the current event does not exist in the database, the FDCS uses the following default profile set policy to determine how to proceed:

If the key type of the current key is not marked as dynamic, no analysis will be performed for this key.

Otherwise, the combination of customer ID and key type will be used to look up the appropriate default profile set. If there is no default profile set defined for this combination, the key type alone will be used to look up the appropriate default profile set. If there is no default profile set defined for the key type alone, no analysis will be performed for this key.

If a key for the current event already exists in the database, a relationship will have already been made between that key and the profile set used to analyse events which contain that key. This relationship will have been established in one of two ways:

The Systems Administrator 64 pre-provisioned the key and its associated data.

The FDCS provisioned the key automatically, using its default profile set policy, the first time the key was presented to the system.

A number of limitations on the FDCS configuration must be enforced to assure that performance and capacity requirements can be met.

At most 7 time intervals can be associated with a single measurement.

At most 5 measurements can be associated with a single key.

At most 3 thresholds can be associated with a single bucket.

The smallest non-zero time interval that can be supported will be 1 minute. The largest time interval that can be supported will be 13 months. Time intervals can be specified to a resolution of 1 minute.

Bucket accumulator values are real numbers in the range of 0 to 1,000,000.

Bucket thresholds are real numbers in the range of 0 to 1,000,000.

At most 5 responses can be generated when a threshold is reached.

At most 5,000 profile sets can be defined.

At most 10,000 profiles can be defined.

The internal processing of the FDM 52 is largely data-driven. The configuration data loaded at start-up controls the content and size of the fraud database caches, as well as runtime parameters such as the refresh rate used for each cache.

At application start-up, the FDM 52 will initialise the caches using the disk-resident database. The FDEs 20 will not be allowed to access the fraud database until initialisation is complete.

The FDM 52 is also responsible for refreshing the disk-resident database from the data caches. This task is performed in the background, when the process has no higher-priority work to perform.

Because the caches are memory-mapped files, the data in the files will reflect the content of the caches at the time the last refresh was performed. If the application is shut down, or should crash, the caches can be restored from the memory-mapped files. This approach allows the FDCS to start up and initialise quickly in the event of planned or unplanned shutdown.

The FDM 52 replaces data records which have been cached in the permanent fraud database based on how recently they have been accessed. In the cache, records that have been updated most recently will tend to displace those that have not been updated recently. The period of time a record remains in cache depends both on the size of the cache and on the current level of activity in the network.

Finally, the FDM 52 provides services to processes which must access the fraud database in real-time. This feature allows authorised users to update the logging attributes of keys maintained in the database.

The Access Control Server (ACS) 58 performs authentication and authorisation on an operator's access to the FDCS. Authentication is the process of validating a User ID and password and authorisation is the process of giving a valid user access to facilities in the network.

The ACS 58 authenticates the operator's User ID and password at FDCS logon time. If the User ID and password matches what is in the FDCS database the operator is allowed to access the main menu, otherwise the operator is denied access. The ACS 58 stores the password in a one-way encrypted form.

The ACS 58 keeps track of information about user accounts. This includes information on invalid logon attempts so that it can disable an operator's account, password expiration, access role information that authorises operators to access specific parts of the FDCS. The ACS 58 also limits a User ID to one session at a time.

The Alarm Manager 54 accepts fraud alarms from one or more FDEs 20, and dispatches the alarms to all active Alarm Presentation processes 24.

The Alarm Manager 54 also manages and dispatches the work status history of all alarms known to the FDCS to the Alarm Presentation processes 24. Alarm history changes come mostly from actions performed by fraud operators while they are working alarms using an Alarm Presentation process 24. The Alarm Manager 54 will escalate an alarm's severity when an alarm remains unaccepted for too long.

The Alarm Manager 54 also manages and dispatches operator alarm annotations to all of the Alarm Presentation processes 24. As annotations are appended to alarms by the fraud operators, the Alarm Manager 54 receives the annotations and dispatches them to all active Alarm Presentation processes 24.

The Alarm Manager 54 manages and dispatches operator information to each of the Alarm Presentation process 24. This information is needed by the Alarm Presentation processes 24 so that operators know to whom they can transfer alarms.

The Alarm Manager 54 also sends alarm, alarm history, and alarm annotation logging requests to the Logging Server process 56.

The Alarm Manager 54 also sends network operator alerts to a printer interface. The Alarm Manager 54 generates the alerts whenever alarms remain undelivered for too long, and whenever alarms are automatically escalated by the Alarm Manager 54.

The Alarm Manager 54 is a background process (i.e. no visual elements).

There is only one Alarm Manager process 54 in the FDCS architecture.

The Logging Server 56 logs call event and alarm information to database tables. The Logging Server 56 processes logging requests asynchronously. That is, the processes making the logging requests do not wait for the Logging Server 56 to finish performing a logging request. The Logging Server 56 is a background process (i.e. no visual elements). Typically, there is only one Logging Server process 56 in the FDCS architecture, although to support scalability, there can be up to one Logging Server process invocation for each other process requiring a connection to it.

The System Process Monitor (SPM) 62 is the controlling module for the FDCS. It starts the FDCS server components, maintains information regarding process and user status and issues regular heartbeat messages. It allows an authorised user to start and stop other processes and disconnect other FDCS users.

The Permanent Storage Monitor (PSM) 67 provides an automated mechanism to notify the FDCS System Administrator whenever certain FDCS and UNIX objects exceed specified size criteria. This will give the FDCS System Administrator 64 an opportunity to correct any size problems before the FDCS runs out of physical storage.

The responsibilities of the PSM 67 include periodically checking the space usage of specified objects and reporting (by way of sending alarms to the NMI) when storage thresholds have been exceeded.

The PSM 67 is a parameter driven program which will periodically analyse disk space available to the FDCS system. Parameters for the program are stored in the relational database. The parameters for this process are of two types: Object Parameters and Process Parameters. Object parameters affect and describe only a single object. Some examples of object parameters are object name, object type, and estimated maximum value. Process parameters affect the entire process and all objects monitored by the process. Threshold percentages, mode reset time, and time to wake up are some examples of process parameters.

The UNIX Console Monitor (UCM) 65 monitors text added to a system console log file. As the messages are logged they are captured and formatted into standard Network Management format and are forwarded to NMI.

When UCM 65 starts, it checks a startup parameter to see if the log file should be examined for messages that may have been added while it was not running. If the parameter is present it loads in the position of the last message it read from the file. It then examines the file to see if any new information has been added. If new information has been added, it will read and forward the messages to the Network Management Interface. If the file has been changed, UCM 65 will attempt to finish reading all the information from the old file before going on to process the new one. It then saves the current position information and schedules itself to examine the file again at some configurable interval. If the parameter is not present then UCM 65 will save the current end of file position and schedule itself for a later time.

The User Logon/Top Level Menu (LGN) process provides an access point to the FDCS. This process is the means by which users identify themselves, gain access to the FDCS, and initiate user processes such as the Alarm Presentation 24 and Process Manager 28.

The LGN process contains two modules: the User Logon (UL) 22 and the Top Level Menu (TLM) 60. The UL 22 is used to capture a User ID and password which are then sent to the Access Control Server 58 for authentication. The ACS 58 then returns information back to the UL 22 indicating any problems with the authentication. If the User ID and password are valid, the UL 22 then gives the user access to the TLM 60.

The TLM 60 provides the user with menus to access subsystems within the FDCS. Some of these subsystems are restricted and may not be accessed by all users. The TLM 60 passes the user's role to ACS 58 to determine what services of the FDCS are available to them. This information is then sent to the TLM 60 which enables facilities. This configuration allows the TLM 60 to restrict access to the variety of services provided by it. Unless a positive authorisation is received from the ACS 58, all facilities are disabled.

Security imposes dependencies on processes and their interconnections. Processes that give users access to information through a user interface are especially vulnerable to security breaches. Because the TLM 60 is the access point to many FDCS subsystems, dependencies are a concern. Therefore, the TLM 60 has been made dependent on the ACS 58, the security agent for the TLM 60. If the ACS 58 shuts down then the TLM 60 shuts down along with all its children.

The Alarm Presentation process 24 is the tool with which the fraud operators work alarms. Operators can use various options to respond to fraud alarms, and they can view alarms in various ways.

The operators can accept an alarm, which identifies the operator working the alarm. Operators can escalate an alarm's severity, which moves an alarm to a higher severity level. Operators can transfer an alarm to another operator, which switches the identity of the operator working the alarm to another operator. Operators can clear an alarm, which ends the work history for an alarm. Operators can also add, delete and modify alarm annotations, or comments, relating to any active alarm. However, only the operator who added an alarm annotation may delete or modify that annotation.

Using the Alarm Presentation process 24, fraud operators can view alarm information. Operators can see alarm summary listings, alarm detail displays, and alarm count displays. The Alarm Presentation process 24 offers options to navigate between the various displays and to change the sort order and blocking of the displays, i.e. the hiding of certain types of alarms from the displays.

The Alarm Presentation process 24 connects to the Alarm Manager process 54 upon initialisation. It then receives a copy of all outstanding (uncleared) alarms. As the fraud operator selects options that work the alarms (i.e. the accept, escalate, transfer, clear, and annotation options), the Alarm Presentation process 24 sends requests to the Alarm Manager process 54 to perform the requested task. If the task is successful, the Alarm Manager 54 broadcasts the new state of the alarm out to all of the logged on Alarm Presentation processes.

The Alarm Manager 54 is a foreground process (with visual elements). Each fraud operator starts an invocation of the Alarm Presentation process 24 by selecting the Alarm Presentation option on the Top-Level Menu 60. There are two main types of windows available to operators to manage fraud alarms:

Alarm Presentation—A scrollable window which displays multiple alarms in a tabular format, one alarm per row.

Alarm Detail—A window which displays all information about a single alarm, including its history and annotations.

There is virtually no limit to the number of Alarm Presentation processes that can be active at any given time.

The Process Manager (PMG) 28 displays a representation of the health of the FDCS system on a user's workstation and allows an authorised user to control the FDCS processes and user connections.

The PMG 28 gives the user a graphical display of the system and connected users. By clicking on the appropriate icon an authorised user can cause a message to be sent to the SPM 62 to stop or start an FDCS process or to disconnect a user.

The Configuration Editor (CFG) process 70 receives requests from the Fraud System Administrator (SA) 64 to update or configure the FDCS application environment. A collection of application data editors provide the facilities for constructing run-time reference data for the FDCS application. The editors are the single source of control for updates to all configuration data within the application.

Changes to configuration data are performed either through real time updates to the application or through change management procedures. In the case of change management activities, the editors provide the ability to define a package of changes, associate a group of changes to configuration data with a specific change package, and release the change package to the FDCS production environment.

The CFG process 70 is invoked by selecting a menu entry from the User Logon/Top Level Menu process 22/60. Upon invocation of the editor process, the FDCS user's role is passed to the editor process and used to obtain the list of services from the Access Control Server 58 for which the user is authorised. The menu entries in the CFG top level menu are then enabled according to the user's authorised list of services. The list of services determines which editors are available to the user as each editor is invoked by selecting an appropriate menu entry.

Each data editor maintains a specific grouping of data objects for the FDCS application and can be categorised as either a real time editor or a change management editor. A real time editor performs updates to data that do not require change control. Updates of this type have very little impact on the running system. For example, adding or deleting a user from the system is performed using a real time editor. A change management editor maintains data that has a much greater impact on the running system and, therefore, must go through change control. Due to the impact these changes have on the running system, the promotion of these changes to production is performed in a coordinated manner. Maintenance of customer profile sets and profiles is an example of data that is maintained using a change management editor.

Real time editors perform immediate updates to the production database and in-memory object model of the running system. Data updates performed through a real time editor are first applied to the production database. After the database has been successfully updated, the CFG process 70 establishes an interprocess communication with the running process whose application data has been modified. It sends the data updates to the process and requests that it updates its in-memory object model. Once updated, the data changes take effect immediately in the running process. Changes to the FDCS access rules are the only exception, becoming effective the next time the user gains access to the system.

Change management editors do not update configuration data in the production database. Application data that is not modified through a change management editor is written to a staging database and updated only in the in-memory object model of the CFG process 70. For each type of change performed, a history of the change is written to the staging database in the form of a Change record. (Change records equate to a system-defined unit of work within each change management editor). The Change records are collected together in a common grouping known as a Change Package and managed as a whole. Individual changes are only applied to the production database when the entire Change Package is promoted to the production environment.

In addition to maintaining application reference data, the CFG process 70 provides an editor for the maintenance of Change Packages and their associated Change records, The Change Management editor provides the ability to modify the Change Package description, and update or delete specific Change records prior to the promotion of the Change Package to the production environment. It also provides the facilities to promote Change Packages to production. When a Change Package is promoted, the CFG process changes the status of modified and deleted data to "history", updates the production database from the staging database, and changes the status of the Change Package to "production". (A single database transaction is used to commit all database updates within a Change Package).

The data editors provided by the CFG process can be grouped into four distinct categories: Application Reference Data Editors, Application Configuration Editors, System Monitor Editors, and Change and Release Management Editors.

To assist an understanding of the operation of the FDE 20, reference may be made to Table 1 (in four parts, A to D) which lists the object classes and their descriptions.

TABLE 1A

| CLASS | DESCRIPTION |
| --- | --- |
| EVENT | Contains all of the fields in a call event record which may be used for analysis or logging |
| EVENT TYPE | The processing the FDE performs on an event depends on its type. The event types are:<br>Successful SCP Calling Card Call<br>Unsuccessful SCP Calling Card Call<br>Partial MIS Calling Card Call<br>Partial MIS CPE Call<br>Full MIS Calling Card Call<br>Full MIS CPE Call<br>A member of the EVENT TYPE class lists the KEY TYPES that will be extracted from an event record of that type.<br>The EVENT TYPE class is responsible for enforcing the data integrity policy that event records of a given type must arrive in chronological sequence. |
| CUSTOMER | The CUSTOMER contains an entry for each customer served by the network. The analysis of call event data can be customized at the customer level by specifying a DEFAULT PROFILE SET for each combination of CUSTOMER and KEY TYPE |

TABLE 1B

| CLASS | DESCRIPTION |
| --- | --- |
| MEASUREMENT | A measurement is an operation performed on a call event which produces a numeric result This numeric result may be accumulated over time to form a pattern of usage, or can be compared directly with a threshold.<br>The types of measurement are:<br>Count of event records<br>Sum of the values in an event record field<br>Conditional count<br>Conditional sum<br>Call overlap<br>Conditional measurements are similar to unconditional measurements, except that a series of screening checks are performed on conditional measurements. |
| SCREENING | A screening check is a test of a particular field value contained in the current event. The types of screening are:<br>Exact match against one of a list of strings<br>Exact match against a list of numeric values<br>Pattern match against a list of strings containing wildcards<br>Range checking of numeric values<br>Range checking of string values<br>More than one screening can be applied to a conditional measurement. In this case, the measurement will only be made if the event passes all of the screening checks. |

TABLE 1C

| CLASS | DESCRIPTION |
| --- | --- |
| KEY TYPE | Contains a set of relationships which determine the analysis path for a given type of key. Supported key types are:<br>Calling Card Number<br>Calling Number<br>Called Number<br>Customer Number<br>Each KEY TYPE contains the name of the field in an event record which will be extracted to form a KEY.<br>Members of the KEY TYPE class may be static or dynamic, which specifies how the FDE should behave when a new key of that type is encountered. If a KEY TYPE is dynamic, this means that a new key is encountered in an event record. It a KEY TYPE is not |

TABLE 1C-continued

| CLASS | DESCRIPTION |
|---|---|
| | dynamic, any keys not already in the database will be ignored. Members of the KEY TYPE class also contain the profile set which will be used for dynamic keys in case no DEFAULT PROFILE SET exists for the combination of CUSTOMER and KEY TYPE. |
| KEY | Each key is a unique string extracted from an event record field defined as a KEY TYPE. Usage measurements are accumulated in BUCKETS for each KEY, according to the PROFILE SET assigned to that KEY. Example key values: "3135551212", "000003". |
| PROFILE SET | Contains a set of PROFILES that control the analysis which will be performed for a KEY. A PROFILE SET will usually be shared by many keys. If the profile set cannot be determined for a particular key, no analysis will be performed for that key. |
| DEFAULT PROFILE SET | Used by the system to automatically assign the PROFILE SET which will be used for the new keys owned by a CUSTOMER. |
| PROFILE | Each PROFILE controls the analysis for one MEASUREMENT in a PROFILE SET. |

TABLE 1D

| BUCKET | Each BUCKET contains the accumulated value of a series of fraud measurements made over a particular time interval, and the expiration time for the time interval. The algorithm which resets a bucket's accumulated value is event-driven, not clock driven. The accumulated value is reset of zero when a bucket is updated with an event that occurred after the expiration time for that bucket. The expiration time is also reset to reflect the end of a new time interval. |
|---|---|
| HISTORY | This class contains historical data needed to perform the CALL OVERLAP measurement. |
| TIME INTERVAL | The time interval over which measurement values will be accumulated. |
| THRESHOLD | Contains the level at which an accumulated measurement value is considered to be suspicious, and the RESPONSE that should be taken when that level is reached. |
| RESPONSE | Contains instructions the FDE uses to respond to a suspicion of fraud, such as creating an alarm message or logging event records for trace purposes. |

A scenario will now be described concerning fraudulent use of calling cards. It is known that a fraudster can observe the keypresses made by an authorised user of a calling card and thereby be in possession of the account number and PIN. It is known for such a fraudster to operate at, say, an airport and to observe arriving passengers using calling cards at the public telephone kiosks when they make genuine calls to say, for example, that they have landed and require to be collected.

The fraudster does not need to have possession of a calling card, only the account number and PIN, which he will acquire by surreptitious observation of the keys pressed by the user. The fraudster now operates by offering, for example, to passengers waiting to depart, to set up a call to someone in a foreign country for an up-front payment. Such passengers may have several hours to wait for their flight and might welcome the opportunity to make a cheap telephone call to family or friends to pass the time.

The fraudster dials the calling card access number, followed by the acquired calling card account and PIN, and then hands the telephone to the passenger who accepted his offer.

In this scenario, each of the public kiosk telephone numbers will be a key for calling number, and each will have a default profile set including a profile for call duration and having an immediate response bucket. When the call is finished the call completion record becomes available from the network Billing system to the FDCS within a few minutes, and, via the calling number, the call duration will be "added" to an instant response bucket having a threshold at, say, 30 minutes (if it has been found that the majority of non-fraudulent calls are less than this duration), and if that was longer than the threshold, an alarm would be sent to a fraud operator 68.

The fraud operator 68 could respond to the alarm by looking at the complete call completion record, and by calling up the calling card account details from a database, say BT's Customer Service System, and if from the account details (name, address and history of card usage) there seemed to be no reason why that customer should be legitimately making long calls from an airport to a foreign destination, then the fraud operator 68 would then bar any further use of that account and notify the customer.

The profile could have screening set so that the measurement (in this case, call duration) is made only if the called number passed all screening checks set for the profile, for example if a particular part of the world had to become associated with fraudulent calls. There will also be a default profile set associated with the calling card number, and the FDCS will retrieve the profiles from the database, update them and return them to the database. In this case the start and stop times of the call will be recorded.

As the fraudster will try to sell as many fraudulent calls as he can, assume now that he has established another fraudulent call from another kiosk. When that call has finished, the FDCS will receive the call completion record and for the calling card key retrieve the profiles from the database, including the start and stop times of the last call record received. A profile is responsible for comparing the previous stop time with the start time of the current call record, determining whether the calls were overlapping, and updating a bucket having instant response (threshold of one) to generate an alarm.

As mentioned above, call records are also received from the SCPs of the network. These are call initiation records, as opposed to call completion records received from the MIS 46 (Billing system), and contain the start time and other details, but not the stop time. These are available to the FDCS almost immediately the call has been attempted, and enable such calls to be detected, but not measured for call duration.

A bucket can be arranged to count call attempts in a time interval for a calling card. This can produce an alarm in the situation where, for example, calling card details (account number and PIN) have been published on a Bulletin Board with an indication that use should be at a certain time, say 3 o'clock. This will result in a multiplicity of fraudulent calls starting at 3 o'clock, and if the FDCS could operate only on call completion records it would not begin to receive these until maybe an hour or more, since the fraudulent calls would probably be of long duration. In this case the FDCS operates on call initiation records, detects the calling card number as a key and updates a call attempt bucket. This could be set at a low threshold, say ten calls over a period of a few minutes.

In a variant, the profile set for a calling card includes a profile for managing a bucket accumulating "penalty points", and the call duration profile is arranged such that the response to the lowest threshold being reached on a bucket includes the allocation of a respective number of penalty points (constituting a fraud risk indicator of the present invention). For example, one of the buckets has a time interval of 24 hours, has screening for international calls and has a lower threshold of 100 mins. The profile rule for this bucket is, for example, to generate 5 penalty points which it adds to the penalty point bucket in the penalty point profile. This profile tests whether the accumulated amount in the bucket has reached any threshold by performing an update in the same manner as all other bucket updates, but with a zero update value.

In this variant, the respective call duration profiles for various called number keys have respective rules for allocating penalty points. For example, for a "hot" Bulletin Board, i.e. one that is used for fraudulent purposes, one of the buckets is an instant response bucket having a threshold at ten minutes, and the response includes an allocation of fifty penalty points.

In accordance with the profile rules, the call event record is examined to obtain the calling card number, if any, and this is used as a pointer to gain direct access to and update the penalty point bucket of that calling card profile in the database.

Other buckets in the call duration profile for that called number, and correspondingly for each called number key, have a respective number of penalty points associated with each threshold. It may be that a particular call event will result in several profiles producing penalty points, and these will be added into the penalty points bucket of the calling card profile.

Alternatively, a profile can process the measurement results (for example call duration) and apply a respective conversion factor to obtain penalty points.

The penalty points profile is not restricted to calling cards and can be associated with calling number keys, for example where a corporate client of the network operator wants to monitor its PABX for possible fraudulent use.

An alternative embodiment of the present invention will now be described with reference to FIGS. 4 to 10.

In relation to an FDS according to this invention, the skilled person will appreciate that the exact arrangement of an intelligent network, and how the FDS interrelates with other components within the network, is not a limiting factor to the scope of the invention.

In an intelligent network, it may be preferable for an FDS to be an integral part of the network intelligence, rather than a separate system in its own right. As part of the network intelligence, the FDS would be able to ensure that service configuration information from all sources could be effectively screened, including requests from third party service providers and other interconnected network operators. It is presently recognised that this arrangement allows types of fraud detection which, hitherto, have not been attempted, for example comparing call requests with user-profile information held within service control databases such as service control points.

Of course, fraud detection in itself is only the first stage in combating fraud. Once detected, a fraudulent call needs to be managed in a way suitable to deter a fraudster from pursuing the same course of action in the future. Fraud management might include cutting a call off or storing evidence enough to prosecute successfully a known fraudster. Thus, preferably, the FDS communicates with a fraud management system (FMS) in the communications network. The FMS is able to control the way in which the network handles, for example, a call request, or a connected call, in the event that the call request, or call, is found to be fraudulent. Preferably, the FMS is responsive to a decision by the FDS that a call request is a fraudulent call request, indicated for example by a flag means in the FDS, to alter the way in which the setup means processes call requests for said fraudulent call request.

Figure 4:
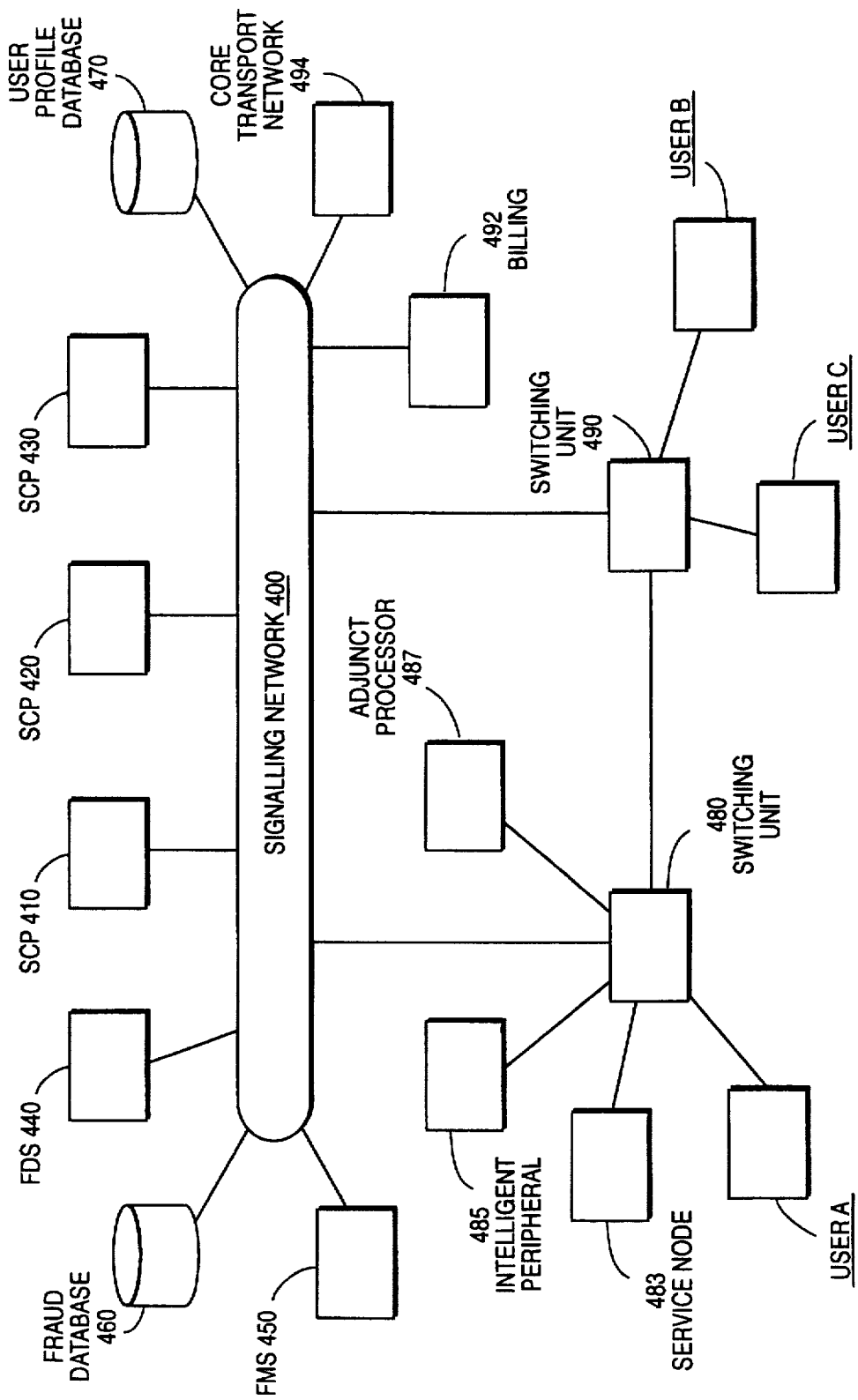
FIG. 4 is a block diagram of an intelligent network including another fraud detection system of the present invention.

Referring now to FIG. 4, there is shown one example of an intelligent network which includes an FDS according to the present invention built into the network intelligence. In FIG. 4, the blocks represent physical entities. For example, an FDS 440 and an SCP 410 are separate computing platforms which run software appropriate to their functions. However, it would be possible for a single physical entity, for example a computing platform, to incorporate appropriate software for both SCP and FDS functions. Thus, a single physical entity would embody two logical entities. Similarly, a single physical entity could incorporate multiple logical entities. In the opposite sense, a single logical entity, for example an SCP function, might be embodied in multiple physical entities, for example a multiple computing environment such as a distributed computing environment (DCE).

The intelligent network of FIG. 4 shows three users: user A, user B and user C. An originating user is a user of the network who makes a call and a terminating user is a user for whom a call is intended. Users may, of course, be both originating and terminating users in accordance with whether they are making or receiving calls. Also, users can be originating users when originating user requests other than call setup requests. A user may be a person, a company, a third-party service provider, a telco employee, an item of equipment or even another network, and in this embodiment constitutes an entity in relation to the key in a key field of an event record. The network includes interconnected switching units for connecting calls between originating and terminating users. FIG. 4 shows two of these switching units, namely switching unit 480 and switching unit 490.

The switching units 480 and 490 may be digital switching units such as the System X exchange manufactured by GEC Plessey Telecommunications or an ATM (asynchronous transfer mode) switch.

To make a call to user B, user A accesses the switching unit 480 via an access network (not shown). The access network may include further switching units and may be an access network for fixed or mobile users. The switching unit 490 may be connected to user B by another access network.

The intelligent network in FIG. 4 includes three service control points (SCPs) 410, 420, 430, which are located remotely from the switching units 480, 490. Each of the SCPs 410, 420, 430 may be connected to the switching units 480, 490 and at least some of the other switching units through a signalling network 400. Thus, the signalling network 400 provides an interface between the SCPs and the switching units. Although not shown in detail, the signalling network 400 is generally used for carrying call set up messages between the switching units. Effectively, the intelligent network in FIG. 4 is arranged as a DCE.

The switching unit 480 is provided with an adjunct processor 487 and can access an intelligent peripheral 485 and a service node 483. The adjunct processor 487 is co-located with the switching unit 480 and connected to it through high-speed interfaces. Although not shown, the switching unit 490 and at least some of the other switching units are each provided with an adjunct processor and can access an intelligent peripheral and a service node.

Each of the SCPs 410, 420 and 430 contains a service logic execution environment (SLEE) and one or more service control programs. Each service control program provides a particular intelligent network service to users of the network. When a switching unit such as the switching unit 480 receives a request to set up an intelligent network call, it sends a query message to the appropriate one of the SCPs 410, 420 and 430.

Figure 5:
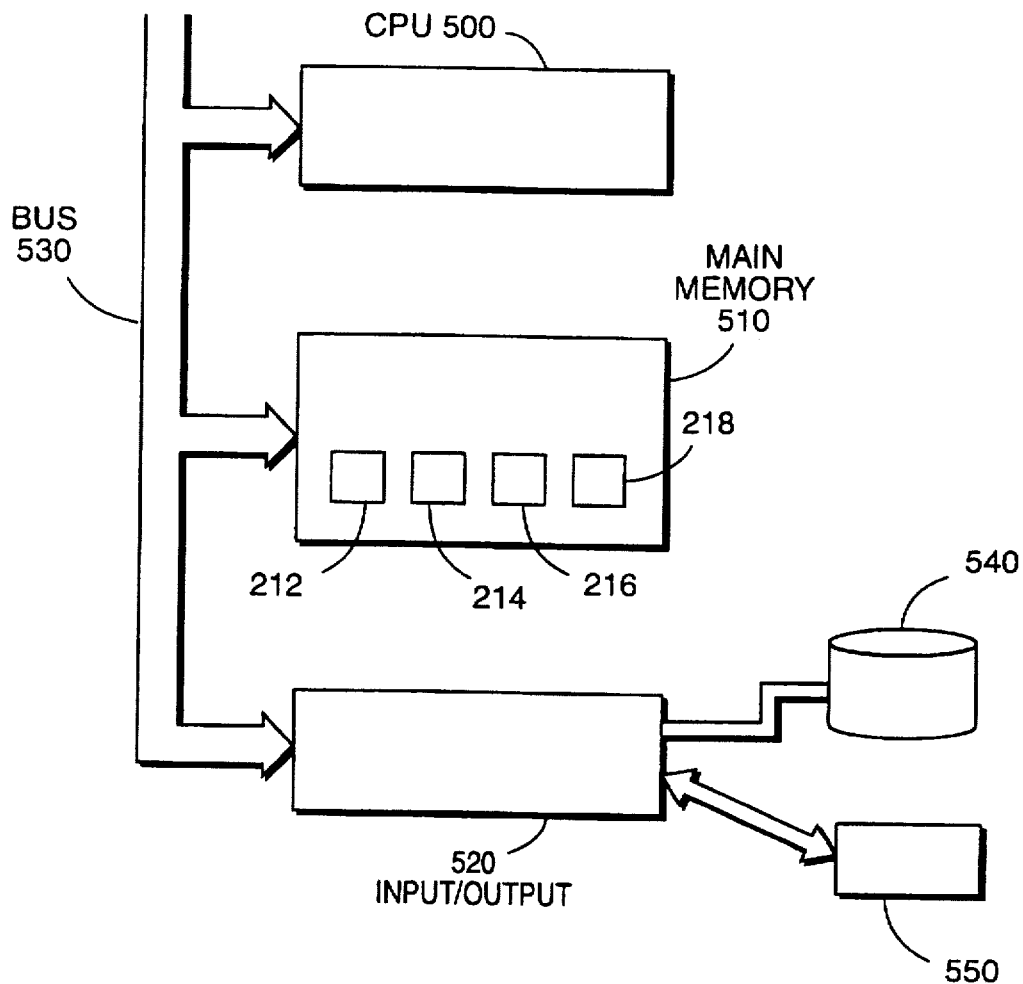
FIG. 5 shows an example architecture for a service control point in the network of FIG. 4.

Referring to FIG. 5, there is shown the structure of one of the SCPs, for example SCP 410. The SCP shown in FIG. 5 comprises a computing platform having a central processing unit (CPU) 500, main memory 510 and an input/output control device 520. The CPU 500 is, for example, a RISC processor such as a SUN Microsystems SparcStation operating under the UNIX operating system. The main memory 510 typically comprises both ROM and RAM. The input/output controller 520 may be, for example, a small computer system interface (SCSI) controller for high speed operation. The input/output controller allows the CPU 500 to access a secondary storage device 540, for example a hard disk, on which call logs or fault reports may be stored, and provides a connection 550 to the intelligent network signalling network 500.

The SLEE 212 in an SCP is implemented as computer software which resides in main memory 510. Service control programs 216 and 218 and a profile interpreter 214 are also implemented as computer software and reside in the main memory 510.

When the SCP 410 receives a query message from a switching unit corresponding to a call request, the SLEE 212 interprets the message and runs the service control program 216 necessary to answer the query message. For a query message relating to a call request, the service control program 216 retrieves the user-profiles of the originating user and the terminating user from a user-profile database 470 and the profile interpreter 214 extracts the information necessary, from the user-profiles, to provide routing information which is returned to the SLEE 212. The SLEE then sends call control instructions including the routing information to the originating switching unit.

Adjunct processor 487 is generally similar in construction to the SCPs 410, 420 and 430 and thus contains an SLEE and one or more service control programs. However, it can be accessed only by switching unit 480 and thus the services which it supports are available only to originating users who can access the switching unit 480 for setting up a call. The intelligent peripheral 485 handles specialised transactions between a user of the network and the intelligent network itself. It has resources such as tones and announcements, voice recognition and voice synthesis.

The service node 483 is capable of controlling intelligent network services in its own right as well as engaging in specialised interactions, such as those provided by the intelligent peripheral 485, between the network and its users. It is essentially a combined SCP and intelligent peripheral but may also have switching ability.

From the above description of an intelligent network with reference to FIGS. 4 and 5, it may be appreciated that in such a network, service control logic may be contained in an SCP, adjunct processor or service node and thus in a unit which is separate from the switching unit. In this specification, the term "intelligent unit" should be construed as meaning a unit which contains service control logic and which is separate from the switching units. The skilled person would understand that the distinction made between different types of intelligent unit in this description is purely exemplary, and is made for ease of understanding only. Other intelligent networks may be arranged differently. In the example of an intelligent network shown in FIG. 4, it would be apparent to the skilled person that the network would find particular application in the field of telephony. However, fraud detection and management according to the present invention could equally as well be applied to more general forms of intelligent network supporting, for example, VoD (video on demand), home-shopping, interactive multimedia services, and/or telemetry.

For a more detailed description of advanced intelligent networks, reference may be made to: "Advanced Intelligent Networks—Now a Reality", by C D Sharpe and K Clegg, IEE Electronics and Communications Engineering Journal, June 1994, pages 153 to 162. This article is incorporated herein by reference.

In one embodiment of the invention, an FDS 440 according to this invention is embodied as a control program, which resides on a computing platform. The FDS 440 has access to a fraud database 460, which is typically separate from but connected to the FDS 440 via the signalling network 400. The database 460 stores historic information relating to past fraudulent calls or call attempts which the FDS 440 needs to determine whether or not a user request is fraudulent. For example, the database 460 may store details of all previously determined hot destinations.

Furthermore, the FDS 440 has access to other databases. For example, the FDS has access to: a billing database 492 in the billing domain of the network to enable it to track excessively long and expensive calls; and the user-profile database 470 to enable detection of potentially fraudulent changes in user-profiles, as described in more detail below. The FDS also has access to core transport network information 494 via a high speed data link 495 or the signalling network 400, again to analyse excessively long calls still in progress. The more data the FDS has access to, the more complex and potentially the more successful the FDS could be in detecting fraud. Access to databases could be provided over the signalling network 400, or alternatively by direct links, depending on the geographical locations of the databases. A further element to which the FDS 440 has access is an FMS 450.

The FMS 450 is also embodied as a control program residing on a computer platform. In practice, the FMS 450 may be separate from the FDS 440, connected via the signalling network 400, or the FMS 450 and the FDS 440 may share a common computing platform as separate logical elements, or software routines.

When the FDS 440 raises a flag that a user request is a fraudulent user request, the FMS recognises the flag and initiates appropriate action to handle the fraudulent user request.

If the FMS 450 and the FDS 440 are separate elements, the flag might be in the form of a data packet which is transferred by the signalling network 400 to the FMS. The data packet would typically contain information relating to the type of fraudulent user request detected and originating user information relevant to the fraudulent request (for example originating telephone number and location).

If the FMS and the FDS share a common computing platform, the flag may simply be a memory register which is 'set' (that is to say the register value is changed by the FDS to indicate that a fraudulent user request has been detected). The relevant fraudulent user information is stored by the FDS in RAM accessible by the FMS. The FMS would read the 'set' memory register, and in response retrieve the relevant information about the fraudulent user request from RAM.

Typically, the FMS 450 is able to handle fraudulent user requests in a number of ways depending on the type of fraudulent request. The simplest action is to prevent a call being completed in response to a call request. However, this action relies on the FDS detecting a fraudulent call request before the call is completed; this would not always be the case. Thus, the FMS 450 has access to core transport information in the core transport network 494 via the signalling network 400, by which the FMS is able to detect if a call has been completed or not.

In the event the FMS 450 receives a flag that a call request is a fraudulent call request, before the call is completed, the FMS is able to either override routing information provided by the respective SCP or routing information received by the respective switching unit, such that the originating user is connected to a telco operator rather than the desired user. The telco operator makes enquiries concerning the call request, thus enabling a stronger determination to be made that the user is a fraudster or not. If the operator determines that the user is a fraudster, then the telephone account may be cancelled, thus preventing further calls being made. If the operator determines the user to be legitimate, the call may be completed, as originally desired by the user, with maybe some credit being offered to the user for any inconvenience suffered.

In the event the call associated with a fraudulent call request is flagged by the FDS 440 and the FMS 450 determines that the call has already been completed, the FMS sends a message to core transport control in the core transport network 494, via the signalling network 400, to re-direct the call from the originating user to a telco operator; the operator makes the same enquiries and takes the same actions as described above. Further to this, the FMS 450 signals to an intelligent peripheral, connected to the terminating user's switching unit, to play an automated message to the terminating user to the effect that the call has been temporarily disconnected, and giving the terminating user the choice of whether to 'hang on' or 'hang up'. If it is determined that the call was made legitimately and the terminating user is 'hanging on', the call is simply re-connected to the terminating user, at no extra cost to the originating user. If it is determined that the call was made fraudulently and the terminating user is still 'hanging on', a further message, to the effect that the call has been permanently disconnected is played. If the terminating user has hung up, no further action is taken.

For user requests other than call requests, the FMS 450 has several options by which action may be taken. Again, a user request, if detected in time, may be prevented from being completed, the user making the request being re-directed to a telco operator. Alternatively, other measures such as closing user accounts or contacting users may be taken, initiated by the FMS 450.

As already indicated, the skilled person will appreciate that the intelligent network illustrated in FIG. 4 shows only one way of implementing an FDS according to the present invention. In another form, for example, a network may comprise a number of applications processors (APs) in a distributed computing environment. The APs may be connected together by a wide area network. The APs might typically be responsible for separate tasks, for example call routing, user-profile interpretation or fraud detection, similar to the network shown in FIG. 4. Also possible is that some or all of the APs carry out multiple tasks, for example each AP may deal with call requests, profile interpretation and fraud detection. Each AP may have its own database facility holding all relevant information for its needs, for example fraud detection, or it may have access to a central database, or there may be a combination of the two. In an environment where each AP deals with fraud detection, it would be important for the APs to be able to transfer important fraud detection information, for example hot destination or origination information to the other APs. This could be achieved by transmitting such information across the wide area network, or even via dedicated data links.

In general, intelligent units of the type shown in FIG. 4, APs, or other types of DCE provide intelligence in relation to a network. However, the actual form the intelligence takes, whether, for example, the FDS resides in one system or in a number of communicating systems, is irrelevant for the present invention and should not be used in any way to limit the scope of the invention.

An FDS may use user-requests in a number of ways to determine whether a request is fraudulent or not. The exact method of determination depends to a large extent on the nature of the request. For example, is it a call request or a user-profile change request.

One method for detecting and managing fraudulent call connection requests is now described with reference to FIG. 6. The method will be described with reference to originating user A making a call to terminating user B, in an intelligent network architecture.

In a first step 600, the originating user A initiates a call by dialling the telephone number of the terminating user B. The number dialled is received by the switching unit 480 which transfers the number, in the form of a query message corresponding to the call request made by user A, across the signalling network 400 to the SCP 410, in a second step 605. In a third step 610, the SCP 410 translates the call request into routing information which is sent back to the switching unit 480, which in turn sets up a call to the terminating user B via switching unit 490. Also in this third step 610, the SCP 410 forwards call request information to the FDS 440 via the signalling network 400. By way of example, the call request information might include: originating user identification of the caller (including any authorisation code, PIN, account code, customer identity); originating location of the caller (i.e. physical line); called user identification and intended destination; terminating point (i.e. actual destination); service information (e.g. 3-way calling or call divert); and a date and time stamp. The type and amount of data sent to the FDS 440 depends on the information available, and what out of that information would be useful for detecting fraud. The call request information would be passed to the FDS 440 for every call request, rather than in batches. That is to say, the whole process is a real-time transaction based process.

In a next step 615, the FDS processes the information received to determine, on the basis of pre-determined criteria, whether or not a call request is fraudulent. Examples of pre-determined criteria are described below. For the avoidance of doubt, while the FDS 440 is processing the information, the call set-up procedures within the network continue unaffected.

In a next step 620 if the call request is deemed not to be fraudulent, at step 625 no action is taken. However, in other embodiments some supervisory, database management or statistical procedures may be carried out.

If the FDS 440 determines that a call request is fraudulent, in a further step 630 a flag is raised by the FDS 440, to indicate the determination to the FMS 450 in the intelligent network.

The FMS 450 has access to relevant core transport information 494 via the signalling network 400 and link 495 by which it is able to establish if a call resulting from a call request has been initiated or not. If in a step 635 the FMS 450 determines that the fraudulent call request has been detected before the corresponding call has been completed to the terminating user B, in a step 640 the FMS 450 signals to the switching unit 480 that the desired call should not be completed and the call should be connected instead to an operator (not shown).

If in the step 635 the FMS 450 determines that a call corresponding to the call request was set up before its fraudulent nature had been detected by the FDS 440, in a step 650 the call can be interrupted, by signalling to the switching unit 480, and re-directed to an operator (not shown). To prevent undue concern on the part of the terminating user B, the FMS 450 may signal to the terminating switching unit 490 to initiate an automated message originating from an intelligent peripheral (not shown), connected to the terminating switching unit 490. The automated message may simply indicate that the originating user A is temporarily off-line.

In a final step 645 the fraud database 460 is updated with information from the call request information, for example, regarding hot destinations.

Another type of fraud detection involves monitoring user-profile changes. User-profiles form part of the service control information in an intelligent network, and contain information relating to a specific user's call requirements. For example, a user may request that all inbound telephone calls to his telephone number are re-directed to another telephone number. This facility is particularly useful when a user is away from home, for example, but still wants to receive telephone calls made to his home number at his temporary telephone number.

In, for example, an advanced intelligent network, a user requests call re-direction by lifting his home telephone handset and dialling, for example for British Telecommunications' network, the code sequence "*21 *{temporary number to divert to}#". This code sequence is received by the user's local switching unit which sends the sequence to the intelligent unit, typically an SCP, which deals with call re-direction. Then, each time a call is made to the user's telephone number, the call request is received by the SCP and is translated into the {temporary number to divert to}. The network is then controlled to set up the call between the originator and the temporary telephone number. The facility can be cancelled simply by dialling, for example, "#21#" from the home telephone.

Information relating to the fact that a user has re-directed his inbound calls, and the number to which his calls are re-directed, is held in his user-profile, which is typically stored on a user-profile database. Each time the user updates his user profile, the database is updated by an intelligent unit, for example, an SCP responsible for user-profile changes.

It has been found possible for a fraudster to be able to capitalise on the ability to change user-profiles by selling at a reduced price either re-directed calls or three-way calls to third-party callers. For example, a fraudster may operate from rented premises having a telephone and an associated telephone line for a period until it is discovered by the line-owning telco that the fraudster is not paying his telephone bill. It may not become apparent to the telecommunications company for several months that he has not paid his bill, in which time thousands of pounds of calls may have been made. When eventually discovered, the fraudster commonly abandons the premises where the telephone is installed without paying any telephone bill.

For the example of call re-direction, a fraudster, for example user B, makes his telephone number known to local third party callers, for example user A, who wish to make long-distance telephone calls, for example international telephone calls. By re-directing his incoming calls to an international number desired by a third-party caller, user B can allow user A to make a locally-charged telephone call to user B whereby the telephone call is re-directed, at no extra cost to user A, to the international telephone number.

A method of achieving fraud detection by monitoring user profile changes will be described with reference to FIG. 7 with user B as the originating user.

In a first step 700, user B requests a change to his user-profile, for example to re-direct incoming calls to telephone number 00 33 356 5000 by keying in the code "*21 *00333565000#".

The local switching unit 480 receives the request in a step 705, recognises that it is a request for a user-profile change, and forwards the request via the signalling network 400 to the SCP 430 responsible for user-profile changes.

In the next step 710, the SCP 430 forwards information relating to the profile change request to the FDS 440, and then continues with completing the user-profile change. The information sent by the SCP 430 to the FDS 440 may include: originating user identification (including any authorisation code, PIN, account code, customer identity); originating location of the user requesting the profile change; the actual profile change requested; and the date and time of the request.

In a further step 715, the FDS 440 processes the information in accordance with predetermined fraud detection criteria to decide whether the request indicates fraudulent behaviour.

The pre-determined criteria for detecting this type of fraudulent behaviour might be for an FDS to monitor all call re-direction requests and raise an alarm if more than, say, two call re-directs from the same originating user occur in a period of less than one hour. Since call re-direct would typically be used if a user is going to be away from their normal location for an extended period of time, more than one call re-direct even in one day might seem abnormal.

The profile change information may be stored on a fraud database accessible by the FDS, or the FDS may have direct read access to the user-profile database 470, to determine the behaviour to be fraudulent.

In a step 720, a check is made to determine whether fraudulent behaviour was found in step 715. If fraudulent behaviour was found, in a step 730, a flag is raised to the FMS 450. The FMS 450, acting in response to the flag, then initiates the action necessary to deter or prevent continuing fraud. Following step 730, the fraud database 460 is updated with relevant fraud information.

If a user-profile change request is not deemed fraudulent, step 720 is followed directly by step 730. Thus, no further action is taken except that the user-profile database or the fraud database is updated with a profile change type and time stamp for potential detection of future fraudulent behaviour.

Three-way calling fraud can be detected in a similar way to call re-direction fraud. A fraudster, for example user B, may use his telephone to set up three-way calls between a first party, for example user A, in one country and a second party in another country who wishes to talk to the first party. In this way, the fraudster, user B, incurs the telephone call charge, and the first and second parties incur no charges. Hence, detection of more than a pre-determined number of long distance, three way calls within a specified period of time would be detected by the FDS 440, which would then raise a flag to the FMS 450, which in turn would initiate appropriate action.

In accordance with the present invention, the ability of the FDS to access user-profile information greatly increases the scope for the detection of fraudulent user behaviour. It is expected that user profiles will include a comprehensive set of information relating to the call patterns of each particular user. This information may be partly supplied by a user, partly a standard set of features reflecting the type of user account required, for example it might be expected that a business account incurs far more foreign calls than a residential account, and may be partly provided by the network intelligence as a result of user behaviour trend analysis, for example if historically a user never calls abroad, the network intelligence may alter that user's profile to indicate this. Then if five calls are made to a foreign country in the space of a few hours, the FDS would see this calling pattern, when compared to the user's profile, as potentially fraudulent.

User-supplied profile information might include, for example, a bar on all foreign calls, a bar on premium rate calls, a limit to acceptable call duration of ten minutes or less or a bar on call re-direct profile changes. Assuming that a legitimate user is aware of his profile restrictions, the FDS would be able to flag potentially fraudulent behaviour if a user attempted to make a call or change a user profile setting, for example call a re-direct request contrary to the user profile restrictions.

It is apparent to the applicants that as user profile information becomes more comprehensive and more user-controllable, the ability of the present invention to monitor user profile information will become increasingly important. Indeed, it is expected that an FDS according to the present invention will have access in future to information hitherto not considered, for example service management information or even network management information from which new types of fraud may be detectable. Obviously, the ability to monitor user profile, or equivalent, information would be valuable in any type of communications system employing fraud detection. For example, such an ability could be usefully employed in systems in which, for example, calls are only set up if fraud detection is unsuccessful.

Figure 8:
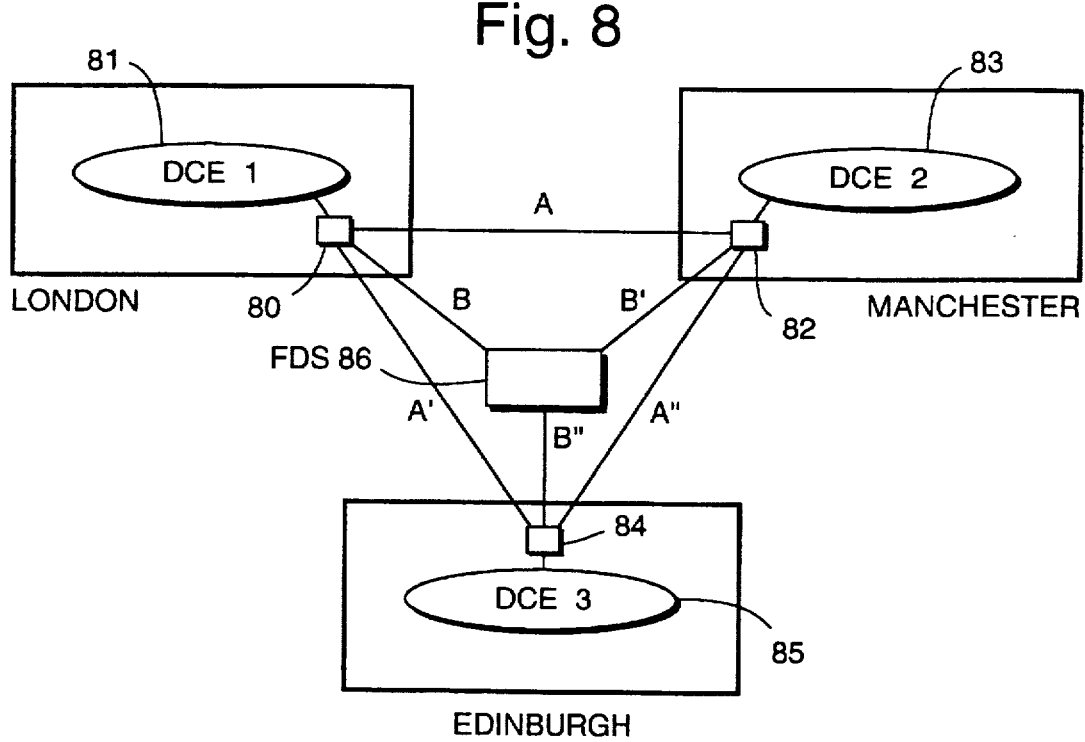
FIG. 8 represents a multiple distributed computing environment intelligent network arrangement.

An alternative to the intelligent network arrangements shown in FIG. 4 would be one when multiple DCEs, each having associated intelligence, may exist across a country-wide, or even a global scale. In FIG. 8, three DCEs 81, 83, 85 are illustrated and represent respectively, for example, networks in London, Manchester and Edinburgh. The DCEs 81, 83, 85 are connected respectively to access points 80, 82, 84. The access points are interconnected by information trunk routes A, A', A", for example optical fibre links, over which information may pass between DCEs.

A single FDS 86 is connected via high speed links B, B', B" to all three DCEs. All, or at least as many as possible, user requests arising in any of the three DCE locations are screened and processed by the FDS 86.

Figure 9:
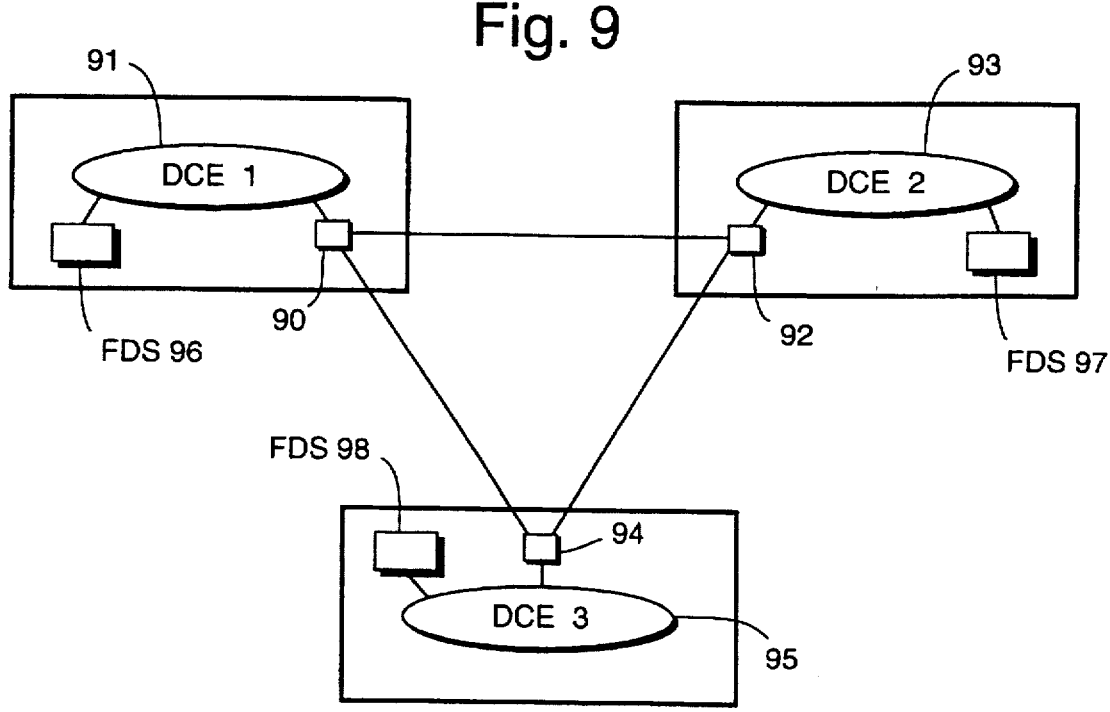
FIG. 9 represents an alternative arrangement to FIG. 8.

Over a larger geographic scale, it is possible that an individual FDS is provided for each DCE, as illustrated in FIG. 9. In FIG. 9, three DCEs 91, 93, 95 are shown located in the UK, France, Germany. The DCEs are interconnected via access points 90, 92, 94 and information trunk routes, or highways, for example optical fibre or satellite links. The DCEs 81, 83, 85 are provided, respectively, with individual FDSs 96, 97, 98, each of which handles user requests for its respective DCE. In a preferred embodiment, the FDSs are able to exchange information relating to fraudulent behaviour. Information transfer may be on an "as required" basis or on a "regular polling" basis which might happen, for example, every hour or every day. The type of information transferred may include, for example, hot destination or even hot origination information, to improve fraud detection over an international arena rather than in a local arena.

Each FDS in multiple DCE environment may have equal priority to the other FDSs. Equally as possible would be the application of a controlling FDS and subordinate FDSs. Then, subordinate FDSs would transfer to the controlling FDS all fraud detection information accumulated over a fixed period, say, of one hour. The controlling FDS would then process the information and distribute the information, which it deemed important, to all subordinate FDSs.

Figure 10:
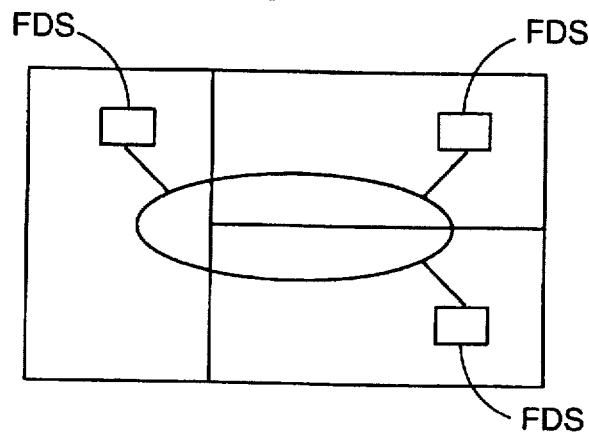
FIG. 10 represents a wide area distributed computing environment.

Eventually, it is envisaged that multiple DCEs connected by trunk routes will be superseded by a wide area DCE, as shown in FIG. 10. In this case, there may be a single FDS, or AP, as described above, or, as illustrated in FIG. 10, there could be several FDSs distributed over the wide area DCE.

An FDS of one embodiment of the present invention can be setup by a network operator, or a service provider, to allocate to a new user a default profile set to give maximum protection (high-risk profile set), this default profile set including every one of a master set of the profiles. The FDS of this embodiment would be arranged to access a billing and accounting function of the network to obtain account details relating to the new user and in response to process those account details in accordance with a determined algorithm and modify the user's profile set in accordance with the process result (to produce a lower-risk profile set). In a simple case, the sequence number of the user's bill is used and the algorithm would determine a lower level of protection for each successive bill, provided that the user had not in the meantime been marked by the fraud operator as a fraudulent user. In a variant, the billing and accounting function is arranged to provide such information to the FDS as and when it becomes available.

We claim:

1. A method of detecting possible fraudulent use of a communications network, which network is arranged to provide call event records having fields containing call event data, at least one of the fields being designated a key field and containing a key relating to an entity as herein defined, the method comprising the steps of:

reading a first key field of a call event record and obtaining its key;

addressing a database by the combination of the first key field and the obtained key (referred to as the "first combination") to access a first combination-associated profile set comprising
(i) at least one profile identifying
(a) a respective call event data processing algorithm defining a process to be performed upon call event data to obtain a process result,
(b) at least one first combination-associated first store to be incremented by the process result, and at least one respective threshold for the or each said first combination-associated first store,
(c) a respective predetermined outcome to be generated when the contents of a said first combination-associated first store reaches a threshold, at least one said predetermined outcome comprising a fraud risk indicator,
(ii) a further profile identifying
(d) a first combination-associated second store to be incremented by a fraud risk indicator,
(e) at least one respective threshold for said first combination-associated second store, and
(f) a further respective predetermined outcome to be generated when the contents of said first combination-associated second store reaches a threshold;

processing the call event data of the call event record in accordance with said first combination-associated profile set, thereby obtaining one or more respective process results, incrementing the corresponding identified first combination-associated first store or stores by the respective process result, and, if a threshold is reached, generating the corresponding respective predetermined outcome, and, if a fraud risk indicator is generated, incrementing said first combination-associated second store by that fraud risk indicator, and, if a threshold is reached, generating the corresponding further respective predetermined outcome.

2. A method as claimed in claim 1, wherein a second of the fields of the call event record is designated a key field and contains a key relating to an entity as herein defined, and the method comprises the further steps of:

reading the second key field of the call event record and obtaining its key;

addressing the database by the combination of the second key field and the obtained key (referred to as the "second combination") to access a respective second combination-associated profile set comprising, (i) at least one profile identifying
(g) a respective call event data processing algorithm defining a process to be performed upon call event data of a call event record to obtain a process result,
(h) at least one second combination-associated first store to be incremented by the process result, and at least one respective threshold for the or each said second combination-associated first store,
(j) a respective predetermined outcome to be generated when the contents of a said second combination-associated first store reaches a threshold, at least one said predetermined outcome comprising a fraud risk indicator, (ii) a yet further profile identifying
(k) the respective first combination-associated second store for the call event record being currently processed to be incremented by a fraud risk indicator generated by a profile of its own profile set;

processing the call event data of the call event record in accordance with said respective second combination-associated profile set, thereby obtaining one or more respective process results, incrementing the corresponding identified second combination-associated first store or stores by the respective process result, and, if a threshold is reached, generating the corresponding respective predetermined outcome, and, if a fraud risk indicator is generated, incrementing said first combination-associated second store by that fraud risk indicator, and, if a threshold of said first combination-associated second store is reached, generating a further respective predetermined outcome in accordance with the further profile of said first combination-associated profile set.

3. A method of detecting possible fraudulent use of a communications network, which network is arranged to provide call event records having fields containing call event data, at least one of the fields being designated a key field and containing a key relating to an entity as herein defined, the method comprising the steps of:

reading a first key field of a call event record and obtaining its key;

addressing a database by the combination of the first key field and the obtained key (referred to as the "first combination") to access a first combination-associated profile set comprising (i) at least one profile identifying
(a) a respective call event data processing algorithm defining a process to be performed upon call event data to obtain a process result,
(b) a respective function to be applied to the process result to generate a fraud risk indicator,
(c) at least one first combination-associated first store to be incremented by the process result, and at least one respective threshold for the or each said first combination-associated first store,
(d) a respective predetermined outcome to be generated when the contents of a said first combination-associated first store reaches a threshold, (ii) a further profile identifying
(e) a first combination-associated second store to be incremented by a fraud risk indicator,
(f) at least one respective threshold for said first combination-associated second store, and
(g) a further respective predetermined outcome to be generated when the contents of said first combination-associated second store reaches a threshold;

processing the call event data of the call event record in accordance with said first combination-associated profile set, thereby obtaining at least one respective process result and associated fraud risk indicator, incrementing the corresponding identified first combination-associated first store or stores by the respective process result, and, if a threshold is reached, generating the corresponding respective predetermined outcome, incrementing said first combination-associated second store by the associated fraud risk indicator, and, if a threshold is reached, generating the corresponding further respective predetermined outcome.

4. A method as claimed in claim 3, wherein a second of the fields of the call event record is designated a key field and contains a key relating to an entity as herein defined, and the method comprises the further steps of:

reading the second key field of the call event record and obtaining its key;

addressing the database by the combination of the second key field and the obtained key (referred to as the "second combination") to access a respective second combination-associated profile set comprising, (i) at least one profile identifying (h) a respective call event data processing algorithm defining a process to be performed upon call event data of a call event record to obtain a process result, (j) a respective function to be applied to the process result to generate a fraud risk indicator, (k) at least one second combination-associated first store to be incremented by the process result, and at least one respective threshold for the or each said second combination-associated first store, (l) a respective predetermined outcome to be generated when the contents of a said second combination-associated first store reaches a threshold, (ii) a yet further profile identifying (m) the respective first combination-associated second store for the call event record being currently processed to be incremented by a fraud risk indicator generated by a profile of its own profile set;

processing the call event data of the call event record in accordance with said respective second combination-associated profile set, thereby obtaining at least one respective process result and associated fraud risk indicator, incrementing the corresponding identified second combination-associated first store or stores by the respective process result, and, if a threshold is reached, generating the corresponding respective predetermined outcome, incrementing said first combination-associated second store by the associated fraud risk indicator, and, if a threshold of said first combination-associated second store is reached, generating a further respective predetermined outcome in accordance with the further profile of said first combination-associated profile set.

5. A method as claimed in any one of claim 1, and including a step of presetting a said combination-associated profile set for a user to a default profile set, and a further step of modifying said preset combination-associated profile set in dependence upon network provided data relating to the user.

6. A method as claimed in claim 5, wherein said network provided data is account-related data.

7. A method as claimed in claim 6, wherein said modifying step is performed automatically in response to provision of said account-related data.

8. A method as claimed in any one of claim 5, wherein said modifying step comprises replacing a profile which identifies a first respective threshold for a said first combination-associated first store by a profile which identifies a second respective threshold for the same said first combination-associated first store, said second respective threshold having a higher value than said first respective threshold.

9. A method as claimed in any one of claim 1, wherein a said generated outcome is or includes entries in a log of the next n call event records occurring which have the same value of key in the first field as that of the call event record which resulted in that response.

10. A fraud detection system for detecting possible fraudulent use of a communications network, which network is arranged to provide call event records having fields containing call event data, at least a first of the fields being designated a key field and containing a key relating to an entity as herein defined, the system comprising:

means for reading a key field of a call event record and obtaining its key and for addressing a database by the combination of said key field and the obtained key (referred to as a "combination");

a database addressable by a said combination and storing a plurality of respective profile sets associated with a first key field and a plurality of keys (referred to as "first combination-associated profile sets"), each first combination-associated profile set comprising (i) at least one profile identifying (a) a respective call event data processing algorithm defining a process to be performed upon call event data of a call event record to obtain a process result, (b) at least one first combination-associated first store to be incremented by the process result, and at least one respective threshold for the or each store, (c) a respective predetermined outcome to be generated when the contents of a said first combination-associated first store reaches a threshold, at least one said predetermined outcome comprising a fraud risk indicator, (ii) a further profile identifying (d) a first combination-associated second store to be incremented by a fraud risk indicator, (e) at least one respective threshold for said first combination-associated second store (f) a further respective predetermined outcome to be generated when the contents of said first combination-associated second store reaches a threshold;

means for processing the call event data of the call event record in accordance with said first combination-associated profile set, thereby obtaining one or more respective process results, incrementing the corresponding identified first combination-associated first store or stores by the respective process result, and, if a threshold is reached, generating a said respective predetermined outcome, and, if a fraud risk indicator is generated, incrementing said first combination-associated second store by the fraud risk indicator, and, if a threshold is reached, generating the corresponding further respective predetermined outcome.

11. A system as claimed in claim 10, for use when a second of said fields is designated a key field and contains a key relating to an entity as herein defined, and wherein the database stores a plurality of respective second combination-associated profile sets comprising (i) at least one profile identifying (g) a respective call event data processing algorithm defining a process to be performed upon call event data of a call event record to obtain a process result, (h) at least one second combination-associated first store to be incremented by the process result, and at least one respective threshold for the or each store, (j) a respective predetermined outcome to be generated when the contents of a said second combination-associated first store reaches a threshold, at least one said predetermined outcome comprising a fraud risk indicator, (ii) a yet further profile identifying (k) the respective first combination-associated second store for the call event record being currently processed to be incremented by a fraud risk indicator generated by a profile of its own profile set, and wherein said processing means is arranged to process the call event data of the call event record in accordance with said respective second combination-associated profile set, thereby obtaining one or more respective process results, incrementing the corresponding identified second combination-associated first store or stores by the respective process result, and, if a threshold is reached, generating a said respective predetermined outcome, and, if a fraud risk indicator is generated, incrementing said first combination-associated second store by that fraud risk indicator, and, if a threshold is reached, generating the corresponding further respective predetermined outcome.

12. A fraud detection system for detecting possible fraudulent use of a communications network, which network is arranged to provide call event records having fields containing call event data, at least a first of the fields being designated a key field and containing a key relating to an entity as herein defined, the system comprising:

means for reading a key field of a call event record and obtaining its key and for addressing a database by the combination of said key field and the obtained key (referred to as a "combination");

a database addressable by a said combination and storing a plurality of respective profile sets associated with a first key field and a plurality of keys (referred to as "first combination-associated profile sets"), each first combination-associated profile set comprising (i) at least one profile identifying (a) a respective call event data processing algorithm defining a process to be performed upon call event data of a call event record to obtain a process result, (b) a respective function to be applied to the process result to generate a fraud risk indicator, (c) at least one first combination-associated first store to be incremented by the process result, and at least one respective threshold for the or each store, (d) a respective predetermined outcome to be generated when the contents of a said first combination-associated first store reaches a threshold, (ii) a further profile identifying (e) a first combination-associated second store to be incremented by a fraud risk indicator, (f) at least one respective threshold for said first combination-associated second store (g) a further respective predetermined outcome to be generated when the contents of said first combination-associated second store reaches a threshold;

means for processing the call event data of the call event record in accordance with said first combination-associated profile set, thereby obtaining at least one respective process result and associated fraud risk indicator, incrementing the corresponding identified first combination-associated first store or stores by the respective process result, and, if a threshold is reached, generating the corresponding respective predetermined outcome, incrementing said first combination-associated second store by the fraud risk indicator, and, if a threshold is reached, generating the corresponding further respective predetermined outcome.

13. A system as claimed in claim 12, for use when a second of said fields is designated a key field and contains a key relating to an entity as herein defined, and wherein the database stores a plurality of respective second combination-associated profile sets comprising (i) at least one profile identifying (h) a respective call event data processing algorithm defining a process to be performed upon call event data of a call event record to obtain a process result, (j) a respective function to be applied to the process result to generate a fraud risk indicator, (k) at least one second combination-associated first store to be incremented by the process result, and at least one respective threshold for the or each store, (l) a respective predetermined outcome to be generated when the contents of a said second combination-associated first store reaches a threshold, (ii) a yet further profile identifying (m) the respective first combination-associated second store for the call event record being currently processed to be incremented by a fraud risk indicator generated by a profile of its own profile set, and wherein said processing means is arranged to process the call event data of the call event record in accordance with said respective second combination-associated profile set, thereby obtaining at least one respective process result and associated fraud risk indicator, incrementing the corresponding identified second combination-associated first store or stores by the respective process result, and, if a threshold is reached, generating the corresponding respective predetermined outcome, and, if a fraud risk indicator is generated, incrementing said first combination-associated second store by that fraud risk indicator, and, if a threshold is reached, generating the corresponding further respective predetermined outcome.

14. A system as claimed in any one of claim 10, and including means responsive to receipt of network provided data relating to a particular user for modifying a profile set associated with that particular user.

15. A system as claimed in claim 14, wherein said modifying means is responsive to account-related data for modifying said profile set.

16. A system as claimed in any one of claim 10, and including means for accessing an accounts function of a communications network and retrieving account-related data associated with a particular user, and modifying means responsive to account-related data retrieved by said accessing and retrieving means to modify a profile set associated with that particular user in dependence upon the retrieved account-related data.

17. A system as claimed in any one of claim 10, wherein said modifying means is arranged to replace a profile which identifies a first respective threshold for a said first combination-associated first store by a profile which identifies a second respective threshold for the same said first combination-associated first store, said second respective threshold having a higher value than said first respective threshold.

18. A system as claimed in any one of claim 10, wherein the outcome generating means is arranged to generate as an outcome, or part of an outcome, entries in a log of the next n call event records occurring which have the same value of key in the first key field as that of the call event record which resulted in that outcome.

19. A communications network incorporating a fraud detection system as claimed in any one of claim 10.

20. A communications network as claimed in claim 19, wherein the network is an intelligent network.

21. A communications network as claimed in claim 20, wherein the fraud detection system forms part of the network intelligence of the intelligent network.

\* \* \* \* \*